US011971669B2

(12) United States Patent
(10) Patent No.: US 11,971,669 B2
(45) Date of Patent: Apr. 30, 2024

Kojima

(54) ELECTROPHOTOGRAPHIC BELT AND ELECTROPHOTOGRAPHIC IMAGE FORMING APPARATUS

(71) Applicant: CANON KABUSHIKI KAISHA, Tokyo (JP)

(72) Inventor: Hiroomi Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/050,113

(22) Filed: Oct. 27, 2022

(65) Prior Publication Data

US 2023/0297009 A1 Sep. 21, 2023

(30) Foreign Application Priority Data

Nov. 5, 2021 (JP) ................................ 2021-181535
Aug. 26, 2022 (JP) ................................ 2022-134699

(51) Int. Cl.
*G03G 15/16* (2006.01)

(52) U.S. Cl.
CPC ................................ *G03G 15/162* (2013.01)

(58) Field of Classification Search
CPC ............ G03G 15/1605; G03G 15/162; G03G 2215/1623
See application file for complete search history.

(56) References Cited

U.S. PATENT DOCUMENTS 9,034,476 B2 5/2015 Uchida et al.
9,058,010 B2 6/2015 Ito et al.
10,168,645 B2 1/2019 Yoshida et al.
10,866,543 B2 12/2020 Hamana et al.
11,143,987 B2 10/2021 Yoshida et al.
2009/0067895 A1* 3/2009 Tominaga .......... G03G 15/0194 399/308
2011/0249995 A1* 10/2011 Uchida ................ G03G 15/162 399/308
2015/0370199 A1 12/2015 Kojima
2018/0173136 A1* 6/2018 Uchida ................. B29D 29/00
(Continued)

FOREIGN PATENT DOCUMENTS

EP 1 112 837 A1 7/2001
EP 2818939 A1 12/2014
(Continued)

OTHER PUBLICATIONS

Kojima, U.S. Appl. No. 18/047,321, filed Oct. 18, 2022.
(Continued)

*Primary Examiner* — Hoang X Ngo
(74) *Attorney, Agent, or Firm* — Venable LLP

(57) ABSTRACT

Provided is an electrophotographic belt having a cylindrical film as a base layer. The cylindrical film contains crystalline polyester and carbon black, and a content of the carbon black in the cylindrical film is 2.0% by mass or more. Fc1 is 0.30 or more, and Φc1 being −10° to +10°, where Fc1 denotes an average degree of arrangement of the carbon black in the circumferential direction observed in a cross section in a direction along a circumferential direction of the cylindrical film, and Φc1 denotes an average arrangement angle of the carbon black in the circumferential direction observed in a cross section in a direction along a circumferential direction of the cylindrical film.

20 Claims, 6 Drawing Sheets

(56) References Cited

U.S. PATENT DOCUMENTS

| | | | |
|---|---|---|---|
| 2020/0363756 | A1 | 11/2020 | Hamana et al. |
| 2022/0308504 | A1 | 9/2022 | Kojima |

FOREIGN PATENT DOCUMENTS

| | | | |
|---|---|---|---|
| JP | 2003-005538 | A | 1/2003 |
| JP | 2006-233150 | A | 9/2006 |
| JP | 2007-292851 | A | 11/2007 |
| JP | 2009-265343 | A | 11/2009 |
| JP | 2012-011743 | A | 1/2012 |
| JP | 2012-098709 | A | 5/2012 |
| JP | 2018-036624 | A | 3/2018 |
| JP | 2020-190720 | A | 11/2020 |

OTHER PUBLICATIONS

Extended European Search Report in European Application No. 22203513.1 (dated Mar. 2023).
Nobuyuki Otsu, "A Threshold Selection Method from Gray-Level Histograms," SMC-9(1) IEEE Trans. Syst. Man Cybern. 62-66 (Jan. 1979).
Extended European Search Report in European Application No. 22205233.4 (dated Mar. 2023).

* cited by examiner

ELECTROPHOTOGRAPHIC BELT AND ELECTROPHOTOGRAPHIC IMAGE FORMING APPARATUS

BACKGROUND

Technical Field

The present disclosure relates to an electrophotographic belt and an electrophotographic image forming apparatus including the electrophotographic belt.

Description of the Related Art

In an electrophotographic image forming apparatus, an endless-shaped electrophotographic belt made of a thermoplastic resin is used as a conveyance transfer belt for conveying a transfer material or an intermediate transfer belt. Such an electrophotographic belt is required to have high strength and high electro-conductivity within a range of, for example, $1\times10^3$ Ω/□ or more and $1\times10^{13}$ Ω/□ in terms of surface resistivity.

In the electrophotographic apparatus, an electrostatic charge image carrying member such as a photosensitive drum is charged, and the charged electrostatic charge image carrying member is exposed to light, thereby forming an electrostatic latent image. Thereafter, the electrostatic latent image is developed by toner subjected to triboelectric charging, and a toner image is transferred and fixed onto a recording medium such as paper, thereby forming a desired image on the recording medium.

A transfer system used in the electrophotographic apparatus is an intermediate transfer system in which a non-fixed toner image on an electrostatic charge image carrying member such as a photosensitive drum is primarily transferred onto an intermediate transfer body by a current supplied from a transfer power supply, and then the non-fixed toner image is secondarily transferred onto a recording medium from the intermediate transfer body. For the primary transfer and the secondary transfer, transfer power supplies are installed and controlled so as to have an optimal current value depending on a surrounding environment (temperature and humidity) or a type of the recording medium. Such an intermediate transfer system is particularly adopted in a color electrophotographic apparatus.

In the color electrophotographic apparatus, four color toners (yellow, magenta, cyan, and black) are sequentially transferred onto the intermediate transfer body from image forming units of respective colors, and the obtained composite images are collectively transferred onto the recording medium, therefore having such an advantage that printing speed is increased and a high-quality image is obtained.

In recent years, a reduction in the number of parts has been studied with growing needs for miniaturization and cost reduction of a copying machine or a printer. Japanese Patent Application Laid-Open No. 2012-098709 discloses an electrophotographic image forming apparatus in which power supplies for a primary transfer and a secondary transfer are used in common so as to use an intermediate transfer body having higher electro-conductivity than before, and the primary transfer is performed by flowing a current from one transfer power supply in a circumferential direction via the intermediate transfer body.

Japanese Patent Application Laid-Open No. 2018-036624 discloses an electrophotographic image forming apparatus including a toner image carrying member that carries a toner image on an outer surface thereof, an intermediate transfer belt, a current supply member in contact with the intermediate transfer belt, and a power supply that applies a voltage to the current supply member. This electrophotographic image forming apparatus is an electrophotographic image forming apparatus in which the toner image is primarily transferred onto the outer surface of the intermediate transfer belt from the toner image carrying member by flowing a current in a circumferential direction of the intermediate transfer belt through the application of the voltage from the power supply to the current supply member. The intermediate transfer belt then includes a first layer having ionic electro-conductivity (hereinafter, abbreviated to a "base layer"), and a second layer having electronic electro-conductivity and lower electric resistance than the first layer (hereinafter, abbreviated to an "electro-conductive layer").

The intermediate transfer belt used in such an electrophotographic apparatus is required to have high electro-conductivity in the circumferential direction of the inner circumferential surface. Japanese Patent Application Laid-Open No. 2020-190720 discloses the following problem: when a large amount of an electronic electro-conductive agent is contained in an electro-conductive layer, a content ratio of a binder resin in the electro-conductive layer is relatively reduced, which results in reduced adhesion of the electro-conductive layer to the base layer. The patent literature also discloses that such a problem can be solved by using a polyester resin having a specific constitution unit.

On the other hand, Japanese Patent Application Laid-Open No. 2006-233150 discloses in Examples 1 to 3 that:

- polyethylene naphthalate, polyethylene terephthalate and two thermoplastic elastomers (trade name: PELESTAT 6321, manufactured by Sanyo Chemical Industries, Ltd; and trade name: Tuftec M1913, manufactured by Asahi Kasei Corporation) are used; and
- even a preform containing a large amount of carbon black exceeding 10 parts by mass relative to 100 parts by mass of the resin component can be biaxially stretched by using the above resin, thus providing a biaxially stretched cylindrical film that can be used for an intermediate transfer belt.

The present inventors have found that a biaxially stretched cylindrical film containing a crystalline polyester resin can have higher strength because crystals of the crystalline polyester are biaxially oriented in the circumferential direction and the axial direction. Therefore, the present inventors expected that the biaxially stretched cylindrical films according to Examples 1 to 3 of Japanese Patent Application Laid-Open No. 2006-233150 would have high electro-conductivity and exhibit excellent durability. However, when the biaxially stretched cylindrical film was used as an intermediate transfer belt, there was a case in which the inner circumferential surface wore relatively quickly due to a friction between the inner circumferential surface of the intermediate transfer belt and a group of rollers such as a driving roller and a stretching roller in contact with the inner circumferential surface. As a result of that, there was a case in which in slippage occurred between the inner circumferential surface and the group of rollers. The occurrence of such slippage may affect the quality of electrophotographic images.

SUMMARY

At least one aspect of the present disclosure is directed to providing an electrophotographic belt having an electro-conductive inner circumferential surface that is less likely to be worn even in long-term use. Further, at least one aspect of the present disclosure is directed to providing an electrophotographic image forming apparatus capable of stably forming high-quality electrophotographic images.

According to at least one aspect of the present disclosure, there is provided an electrophotographic belt comprising a cylindrical film as a base layer, the cylindrical film comprising a crystalline polyester, an amorphous polyester and carbon black, and a content of the carbon black in the cylindrical film being 2.0% by mass or more; and Fc1 being 0.30 or more, and Φc1 being −10° to +10°, where Fc1 denotes an average degree of arrangement of the carbon black in the circumferential direction observed in a cross section in a direction along a circumferential direction of the cylindrical film, and Φc1 denotes an average arrangement angle of the carbon black in the circumferential direction observed in a cross section in a direction along a circumferential direction of the cylindrical film.

According to at least one aspect of the present disclosure, there is provided an electrophotographic image forming apparatus including the electrophotographic belt as an intermediate transfer belt.

Further features of the present disclosure will become apparent from the following description of exemplary embodiments with reference to the attached drawings.

BRIEF DESCRIPTION OF THE DRAWINGS

FIG. 5B-1 is an illustrative diagram of a configuration example of an electrophotographic belt according to the present disclosure.

FIG. 5B-2 is an illustrative diagram of a configuration example of an electrophotographic belt according to the present disclosure.

DESCRIPTION OF THE EMBODIMENTS

Figure 1:
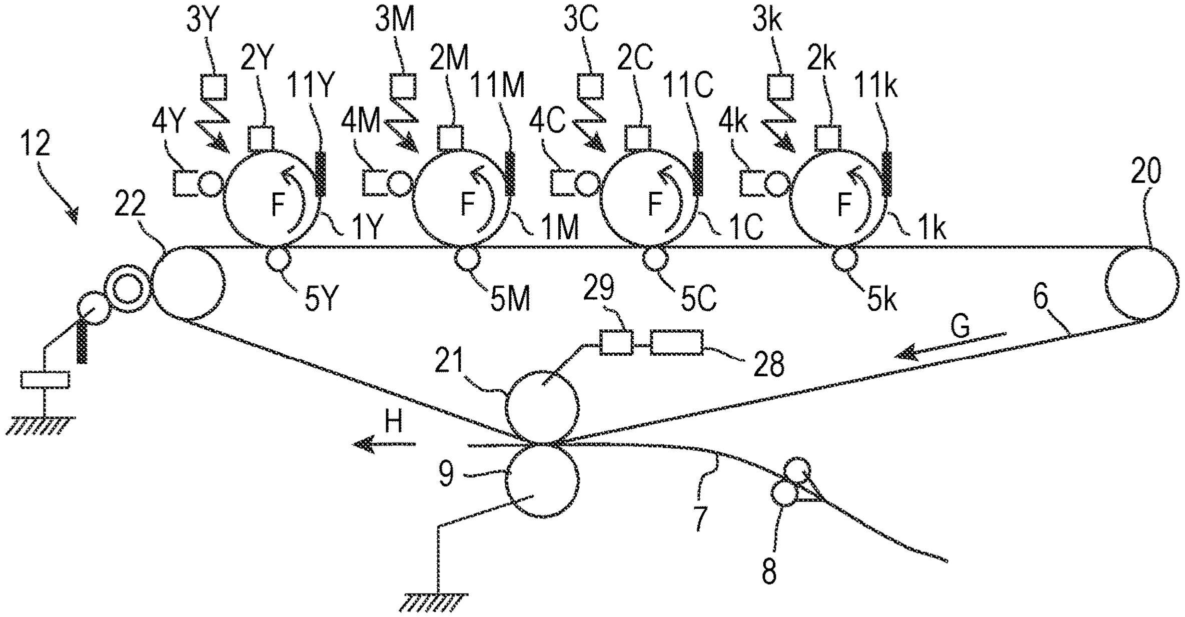
FIG. 1 is a schematic cross-sectional view illustrating one example of a full-color electrophotographic image forming apparatus employing an electrophotographic process.

Preferred embodiments of the present disclosure will now be described in detail in accordance with the accompanying drawings.

In the present disclosure, the description "XX or more and YY or less" and "XX to YY" representing a numerical range means a numerical range including a lower limit and an upper limit which are endpoints, unless otherwise specified. When the numerical ranges are listed in stages, the upper and lower limits of each numerical range can be arbitrarily combined. In the present disclosure, "Ω/□", which is a unit of the surface resistivity, means "Ω/square".

The present inventors presume that the reason why an inner circumferential surface of a biaxially stretched cylindrical film according to Japanese Patent Application Laid-Open No. 2006-233150 wears relatively early is a low affinity between "PELESTAT 6321" used as the thermoplastic elastomers and crystalline polyester. That is, "PELESTAT 6321" is polyether ester amide, and an affinity between polyether ester amide and crystalline polyester is low. Thus, in a preform for forming the biaxially stretched cylindrical film according to Japanese Patent Application Laid-Open No. 2006-233150, carbon black is unevenly distributed in a phase containing the polyether ester amide without direct contact with the crystalline polyester. Accordingly, rapid crystallization of the crystalline polyester with carbon black as a core is suppressed during the biaxial stretching step of the preform. Therefore, it is considered that even the preform containing carbon black in an amount necessary for exhibiting electro-conductivity can be biaxially stretched. However, the polyether ester amide that prevents the carbon black from coming into direct contact with the crystalline polyester has a low affinity with the crystalline polyester. Therefore, an interface between the phase containing the polyether ester amide and the phase containing the crystalline polyester tends to peel off easily. Accordingly, it is considered that the inner circumferential surface of the biaxially stretched cylindrical film according to Japanese Patent Application Laid-Open No. 2006-233150 wears relatively early.

Thus, the present inventors have made intensive studies to obtain an electrophotographic belt which satisfies both high electro-conductivity of the inner circumferential surface and excellent abrasion resistance of the inner circumferential surface at a higher level. As a result, the present inventors have found that according to the following electrophotographic belt, the above-described contradictory objects can be achieved at a higher level.

In other words, the electrophotographic belt according to one aspect of the present disclosure has a cylindrical film as a base layer. The cylindrical film contains a crystalline polyester, an amorphous polyester and carbon black, and a content of the carbon black in the cylindrical film is 2.0% by mass or more. In a cross section in a direction along a circumferential direction of the cylindrical film, an average degree of arrangement of the carbon black in the circumferential direction, Fc1, is 0.30 or more, and an average arrangement angle thereof, Φc1, is −10° to +10°.

In the electrophotographic belt according to at least one aspect of the present disclosure, the carbon black is arranged in the circumferential direction of the cylindrical film constituting a substrate thereof in a cross section in a direction along the circumferential direction of a cylindrical film. Accordingly, higher electro-conductivity in the circumferential direction of the inner circumferential surface can be exhibited with a relatively small amount of carbon black. As a result, the content ratio of the binder in the cylindrical film can be increased, therefore improving the abrasion resistance of the inner circumferential surface.

Figure 6A:
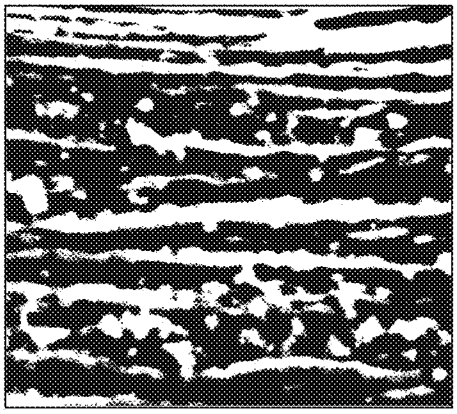
FIG. 6A illustrates an example of a binarized image of an SEM image in a cross section of a cylindrical film according to one aspect of the present disclosure, and is a binarized image of an SEM image in a cross section in a direction along a circumferential direction of the cylindrical film.

In addition, as illustrated in FIG. 6A, in the cross section in the circumferential direction of the cylindrical film, a region containing carbon black is present in the form of a layer between the binders. Therefore, the inner circumferential surface is unlikely to be roughened even if the inner circumferential surface is worn. It is considered that such factors also contribute to the difficulty in progression of the abrasion of the inner circumferential surface.

Hereinafter, the electrophotographic belt according to one aspect of the present disclosure will be described in detail. Note that the present disclosure is not limited to the following aspect.

<Electrophotographic Belt>

The electrophotographic belt according to the present disclosure has a cylindrical film as a base layer.

Figure 2:
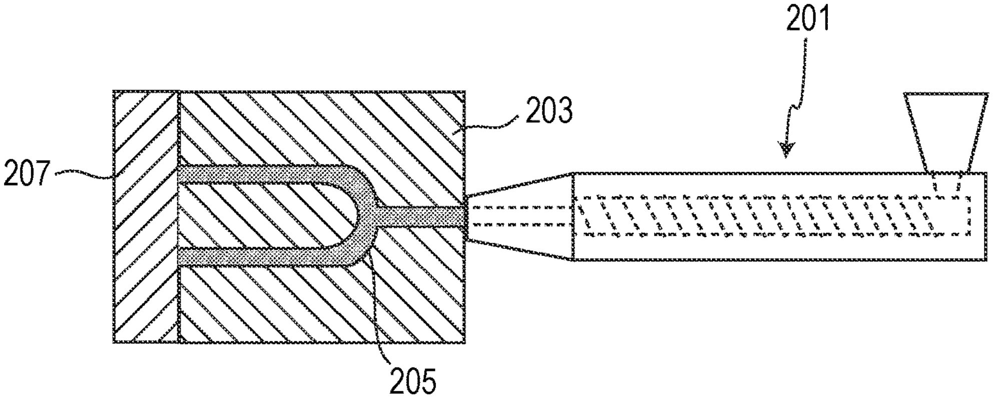
FIG. 2 is a schematic cross-sectional view of an injection molding apparatus used in Examples.
Figure 5A:
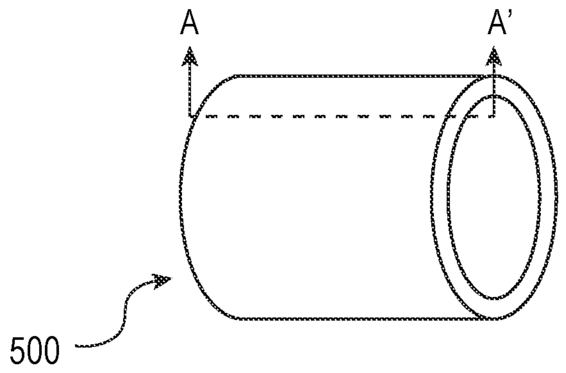
FIG. 5A is an illustrative diagram of a configuration example of an electrophotographic belt according to the present disclosure.
Figures 1, 5B:
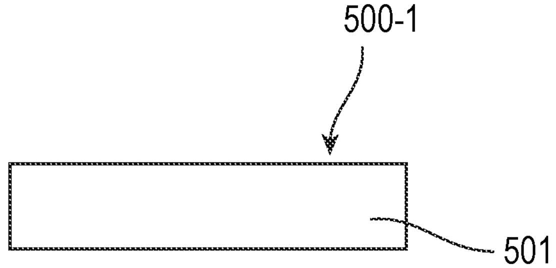
Figures 2, 5B:
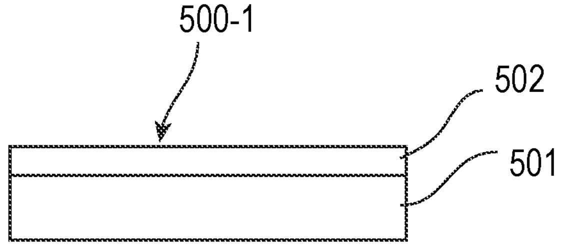

FIG. 5A illustrates a perspective view of an electrophotographic belt 500 having an endless belt shape according to one aspect of the present disclosure. Examples of the layer configuration include a monolayer structure in which the cross section of the line A-A' in FIG. 5A is composed of only a base layer 501 as illustrated in FIG. 5B-1. In this case, an outer surface 500-1 of the base layer is a toner carrying surface (outer surface) of the electrophotographic belt. In addition, another example of the layer configuration includes a laminated structure in which the cross section of the A-A' line has the base layer 501 and a surface layer 502 covering the outer peripheral surface of the base layer as illustrated in FIG. 5B-2. When the surface layer 502 is provided, the outer surface 500-1 of the surface layer 502 serves as the toner carrying surface of the electrophotographic belt. In any of the configurations illustrated in FIGS. 5B-1 and 5B-2, the inner circumferential surface of the cylindrical film constitutes the inner circumferential surface of the electrophotographic belt.

<Base Layer>

The cylindrical film constituting the base layer contains amorphous polyester, carbon black and crystalline polyester as a binder. The content of the carbon black in the cylindrical film is 2.0% by mass or more.

In a cross section in a direction along a circumferential direction of the cylindrical film, an average degree of arrangement of the carbon black in the circumferential direction, Fc1, is 0.30 or more, and an average arrangement angle thereof, Φc1, is −10° to +10°. By setting the average degree of arrangement of the carbon black in the circumferential direction, Fc1, to 0.30 or more and the average arrangement angle Φc1 to −10° to +10°, the abrasion of the inner circumferential surface when the electrophotographic belt is repeatedly used can be suppressed while the electro-conductivity of the inner circumferential surface is maintained.

<Average Degree of arrangement of Carbon Black, Fc1, and Average Arrangement Angle of Carbon Black, Φc1>

The average degree of arrangement of the carbon black contained in the cylindrical film in the circumferential direction of the cylindrical film, Fc1 (hereinafter, also simply referred to as "Fc1") and the average arrangement angle of the carbon black contained in the cylindrical film in the circumferential direction of the cylindrical film, Φc1 (hereinafter, also simply referred to as "Φc1") will be described.

Each of the Fc1 and the Φc1 is a parameter representing a state of arrangement of the carbon black contained in the cylindrical film in the circumferential direction and a degree of the arrangement. The Fc1 and the Φc1 will be described in detail below.

In order to calculate the Fc1 and the Φc1, a measurement sample is first prepared from the cylindrical film. A sample having a length of 5 mm in the circumferential direction, a length of 5 mm in a direction perpendicular to the circumferential direction (axial direction) and a thickness equal to the total thickness of the cylindrical film was cut out from any position of the cylindrical film. Regarding the cut-out sample, a first cross section in a direction along the circumferential direction of the thickness-cylindrical film is polished with an ion beam. For example, a cross section polisher can be used for the polishing of the cross section by the ion beam. The polishing of the cross section by the ion beam can prevent the carbon black from falling out of the sample and a polishing agent from mixing with the sample, and can also form the cross section with few polishing marks.

Subsequently, the polished first cross section is observed with a scanning electron microscope (SEM), and an image (SEM image) of a square observation region of 5 μm in length×5 μm in width is obtained at a predetermined position of the first cross section. At this point, the longitudinal direction of the SEM image is adjusted to be parallel to the thickness direction of the cylindrical film, and the transverse direction of the SEM image is adjusted to be parallel to the circumferential direction of the cylindrical film. The resolution is set to a resolution sufficient to analyze carbon black appearing in the first cross section (for example, 2000 pixels in length×2000 pixels in width).

Note that it is preferable to dye the first cross section prior to the formation of the SEM image because the contrast of the SEM image can be further improved. By forming the SEM image with high contrast, binarization processing described below can be performed more accurately. For example, ruthenium tetroxide can be used for the dyeing.

The obtained SEM image is then binarized such that the carbon black becomes white, and the binder blinder is black to obtain a binarized image. FIG. 6A illustrates one example of the binarized image. In FIG. 6A, a white region indicates a carbon black portion, and a black portion indicates a binder portion. Note that in FIG. 6A, a horizontal direction is the circumferential direction of the cylindrical film, and a vertical direction is the thickness direction of the cylindrical film. As the binarization processing, for example, the Otsu's method described in IEEE Transactions on SYSTEMS, MAN, AND CYBERNETICS, vol. SMC-9, No. 1, Jan. 1979, pp 62-66 can be used. The binarization processing can be performed using commercially available image processing software. Examples of the commercially available image processing software include "ImageJ" (trade name, manufactured by National Institutes of Health).

Figure 7A:
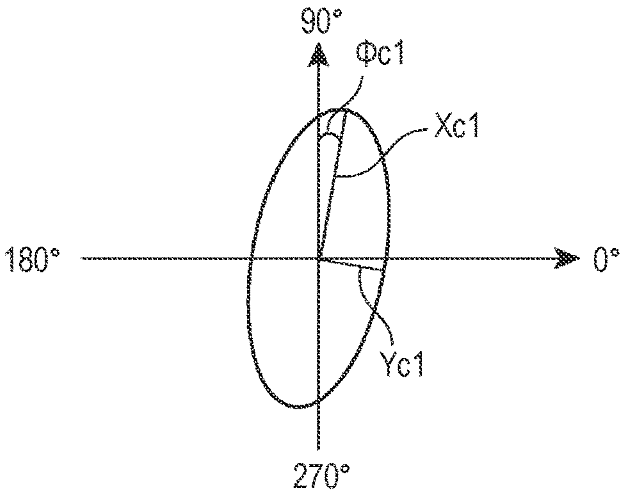
FIG. 7A is a schematic ellipse plot illustrating the direction and degree of arrangement of carbon black in a circumferential direction of an electrophotographic belt according to the present disclosure.

Next, the obtained binarized image is subjected to a two-dimensional Fourier transform, the power spectrum is integrated in the circumferential direction of the cylindrical film, and an ellipse plot indicating the direction and degree of arrangement of the carbon black in the circumferential direction is obtained (see FIG. 7A).

In the two dimensional Fourier transform, a peak appears in a perpendicular direction to the periodicity of the image.

Figure 7B:
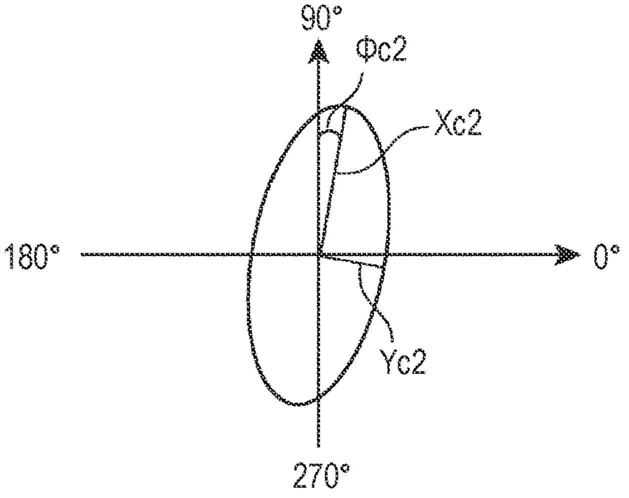
FIG. 7B is a schematic ellipse plot illustrating the direction and degree of arrangement of carbon black in a circumferential direction of an electrophotographic belt according to the present disclosure.
Figure 7C:
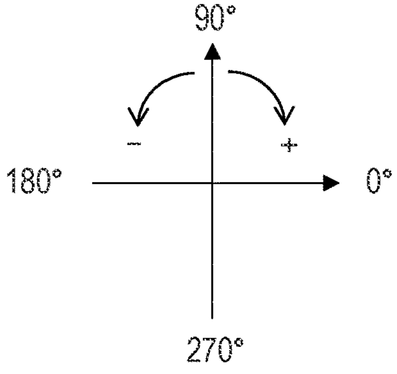
FIG. 7C is a schematic ellipse plot illustrating the direction and degree of arrangement of carbon black in a circumferential direction of an electrophotographic belt according to the present disclosure.

Therefore, in the ellipse plot illustrated in FIG. 7A to be obtained by performing the two dimensional Fourier transform on the binarized image, the 90° to 270° direction (vertical axis direction) indicates the circumferential direction of the cylindrical film, and the 0° to 180° direction (horizontal axis direction) indicates the thickness direction of the cylindrical film. An angle (arrangement angle) formed by the semimajor axis Xc1 of the ellipse plot ϕc1 relative to the 90° to 270° direction is a parameter indicating the arrangement state of carbon black in the circumferential direction of the cylindrical film. In the ellipse plot illustrated in FIG. 7A, as illustrated in FIG. 7C, when + is denoted as the rotational direction from 90° to 0° (clockwise direction), and − is denoted as the rotational direction from 90° to 180° (counterclockwise direction), the arrangement angle ϕc1 may take a value of −90° to +90°. The smaller the value of the arrangement angle ϕc1, the more strongly the carbon black is arranged in the circumferential direction of the cylindrical film.

In addition, in the ellipse plot, when Xc1 is defined as a semimajor axis, Yc1 as a semiminor axis perpendicular to the semimajor axis, xc1 as a length of the semimajor axis Xc1, and yc1 as a length of the semiminor axis Yc1, a degree of arrangement fc1 is defined as a flattening of the ellipse plot determined by the following calculation formula (1).

$$fc1=1-(yc1/xc1) \quad (1)$$

The degree of arrangement fc1 may take a value of 0.00 or more and less than 1.00. If the carbon black is completely randomly dispersed with no arrangement in the circumferential direction, the degree of arrangement fc1 is 0.00. The degree of arrangement fc1 approaches 1.00 as the degree of arrangement of carbon black in the circumferential direction becomes stronger. In other words, the degree of arrangement fc1 is a parameter representing the degree of the arrangement of the carbon black in the circumferential direction. The average arrangement angle Φc1 and the average degree of arrangement Fc1 according to the present disclosure are average values of the arrangement angle ϕc1 and the degree of arrangement fc1 determined from the first cross section of each of 20 samples cut out from any position of the cylindrical film to be evaluated.

The average arrangement angle Φc1 according to the present disclosure is −10° to +10°, preferably −7° or more and +7° or less, and more preferably −2° or more and +2° or less.

The average degree of arrangement Fc1 according to the present disclosure is 0.30 or more, preferably 0.40 or more, and more preferably 0.50 or more. The upper limit value of the average degree of arrangement Fc1 is not particularly limited, and is preferably as high as possible. However, the upper limit value may be, for example, 0.99 or less, particularly 0.80 or less, and further 0.70 or less. Hence, a preferable range of the average degree of arrangement Fc1 is, for example, 0.30 or more and 0.99 or less, particularly 0.40 or more and 0.80 or less, and further 0.50 or more and 0.70 or less.

When the average arrangement angle Φc1 and the average degree of arrangement Fc1 are within the above ranges, the abrasion resistance of the inner circumferential surface can be improved while the electro-conductivity in the circumferential direction on the inner circumferential surface of the cylindrical film is maintained. In other words, it is considered that the carbon black is arranged so as to extend in the circumferential direction, and thus an electro-conductive path is easily formed by the carbon black in the circumferential direction of the cylindrical film. As a result, the content ratio of the carbon black necessary for exhibiting electro-conductivity in the circumferential direction can be relatively decreased. Conversely, the content ratio of the binder in the cylindrical film can be increased. Accordingly, the cylindrical film according to one aspect of the present disclosure may have high electro-conductivity in the circumferential direction of the inner circumferential surface and high abrasion resistance of the inner circumferential surface. As illustrated in FIG. 6A, the cylindrical film according to one aspect of the present disclosure also has a region containing carbon black, the region extending in the form of a layer in the circumferential direction of the cylindrical film. Therefore, even if the inner circumferential surface of the electrophotographic belt including the cylindrical film is worn due to use, the inner circumferential surface is less likely to be roughened. It is considered that the rougher the surface, the more likely it is that abrasion will further progress due to its concavity and convexity. However, it is considered that in the cylindrical film according to the present aspect, the inner circumferential surface is less likely to be roughened due to the abrasion of the inner circumferential surface. It is considered that this factor also contributes to the development of excellent abrasion resistance on the inner circumferential surface of the cylindrical film according to the present aspect.

<Average Degree of arrangement of Carbon Black, Fc2, and Average Arrangement Angle of Carbon Black, Φc2>

In the cylindrical film according to one aspect of the present disclosure, when Fc2 is defined as an average degree of arrangement of carbon black in a cross section in a direction along an axial direction and Φc2 as an average arrangement angle thereof, Fc2 is preferably 0.30 or more while Φc2 is preferably −10° to +10°. By satisfying these requirements, it is possible to ensure further uniformity of the electro-conductivity in the direction along the axial direction of the inner circumferential surface and further improve the abrasion resistance of the inner circumferential surface as a whole.

Figure 6B:
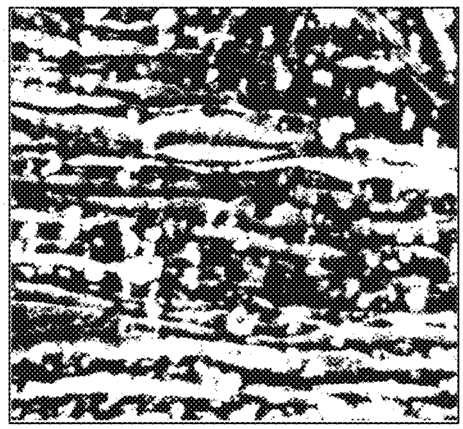
FIG. 6B illustrates an example of a binarized image of an SEM image in a cross section of a cylindrical film according to one aspect of the present disclosure, and is a binarized image of an SEM image in a cross section in a direction along an axial direction of the cylindrical film.

Fc2 and Φc2 can be obtained by basically the same method except that the observation cross section of the sample is changed from the first cross section to the second cross section in the direction along the thickness-axial direction. Note that when the SEM image is obtained from the second cross section, the longitudinal direction of the SEM image is adjusted to be parallel to the thickness direction of the cylindrical film, and the transverse direction of the SEM image is adjusted to be parallel to the axial direction of the cylindrical film. Then, a binarized image is created from the SEM image obtained from the second cross section in the same manner as described above. FIG. 6B illustrates one example of the binarized image. In FIG. 6B, a horizontal direction is the axial direction of the cylindrical film, and a vertical direction is the vertical direction of the cylindrical film. Subsequently, the obtained binarized image is subjected to a two-dimensional Fourier transform in the same manner as described above to obtain an ellipse plot. FIG. 7B illustrates one example of the ellipse plot. In the ellipse plot illustrated in FIG. 7B, the 90°-270° direction (vertical axis direction) indicates the axial direction of the cylindrical film, and the 0°-180° direction (horizontal axis direction) indicates the thickness direction of the cylindrical film. An angle (arrangement angle) formed by the semimajor axis Xc2 of the ellipse plot ϕc2 relative to the 90° to 270° direction is a parameter indicating the arrangement state of carbon black in the axial direction of the cylindrical film. In the ellipse plot illustrated in FIG. 7B, as illustrated in FIG. 7C, when + is denoted as the rotational direction from 90° to 0° (clockwise direction), and − is denoted as the rotational direction from 90° to 180° (counterclockwise direction), the arrangement angle $\phi c2$ may take a value of −90° to +90°. The smaller the value of the arrangement angle $\phi c2$, the more strongly the carbon black is arranged in the axial direction of the cylindrical film.

In addition, in the ellipse plot, when Xc2 is defined as a semimajor axis, Yc2 as a semiminor axis perpendicular to the semimajor axis, xc2 as a length of the semimajor axis Xc2, and yc2 as a length of the semiminor axis Yc2, a degree of arrangement fc2 is defined as a flattening of the ellipse plot determined by the following calculation formula (2).

$$fc2=1-(yc2/xc2) \quad (2)$$

The degree of arrangement fc2 may take a value of 0.00 or more and less than 1.00. If the carbon black is completely randomly dispersed with no arrangement in the circumferential direction, the degree of arrangement fc2 is 0.00. The degree of arrangement fc2 approaches 1.00 as the degree of arrangement of carbon black in the circumferential direction becomes stronger. In other words, the degree of arrangement fc2 is a parameter representing the degree of the arrangement of the carbon black in the axial direction. The average arrangement angle $\Phi c2$ and the average degree of arrangement Fc2 according to the present disclosure are average values of the arrangement angle $\phi c2$ and the degree of arrangement fc2 determined from the second cross section of each of 20 samples cut out from any position of the cylindrical film to be evaluated.

The average arrangement angle $\Phi c2$ according to the present disclosure is −10° to +10°, preferably −7° or more and +7° or less, and more preferably −2° or more and +2° or less.

The average degree of arrangement Fc2 according to the present disclosure is 0.30 or more, preferably 0.40 or more, and more preferably 0.50 or more. The upper limit value of the average degree of arrangement Fc2 is not particularly limited, and is preferably as high as possible. However, the upper limit value may be, for example, 0.99 or less, particularly 0.80 or less, and further 0.70 or less. Hence, a preferable range of the average degree of arrangement Fc2 is, for example, 0.30 or more and 0.99 or less, particularly 0.40 or more and 0.80 or less, and further 0.50 or more and 0.70 or less.

When the average arrangement angle $\Phi c2$ and the average degree of arrangement Fc2 are in the above ranges, the electro-conductivity in the axial direction on the inner circumferential surface of the cylindrical film may be made more uniform. In addition, the abrasion resistance on the inner circumferential surface of the cylindrical film can be improved more uniformly over the axial direction. In other words, it is considered that the carbon black is arranged so as to extend in the axial direction, and thus an electro-conductive path is easily formed by the carbon black in the axial direction of the cylindrical film. As a result, the content ratio of the carbon black necessary for exhibiting electro-conductivity in the axial direction can be relatively decreased. Conversely, the content ratio of the binder in the cylindrical film can be increased. Accordingly, the cylindrical film according to one aspect of the present disclosure may have uniform and high electro-conductivity in the axial direction of the inner circumferential surface and high abrasion resistance in the axial direction of the inner circumferential surface.

The cylindrical film satisfying the above-described Fc1 and $\Phi c1$ and satisfying the above-described Fc2 and $\Phi c2$ as preferable characteristics may be, for example, a cylindrical film as described below (hereinafter also referred to as a "biaxially stretched cylindrical film"). In other words, the cylindrical film may be obtained by stretching a test tube-shaped preform formed of a resin mixture containing a crystalline polyester, an amorphous polyester and carbon black in biaxial directions of a longitudinal direction and a circumferential direction thereof.

That is, the biaxially stretched cylindrical film can be produced, for example, through the following steps (i) to (iii):

Step (i): A test tube-shaped preform is obtained from a resin mixture containing a crystalline polyester, an amorphous polyester and carbon black;

Step (ii): The preform is stretched in the longitudinal direction thereof, and a gas is also introduced into the preform to perform stretch forming in two axes of the longitudinal direction and the circumferential direction, thereby providing a molded article (hereinafter also referred to as a "bottle") (biaxial stretch blow molding); and Step (iii): Both ends of the bottle are cut to obtain an endless-shaped cylindrical film.

Regarding Step (i), pellets of a resin mixture containing a crystalline polyester, an amorphous polyester and carbon black are first prepared. At this time, it is preferable that the amorphous polyester and the carbon black are melted and kneaded to prepare an amorphous polyester mixture, the amorphous polyester mixture is then mixed with the crystalline polyester, and the mixture is further thermally melted and kneaded to prepare a resin mixture. As a result, it is easier to obtain a resin mixture having a phase-separated structure in which a phase containing amorphous polyester and carbon black is present in a phase containing crystalline polyester. Note that when two or more crystalline polyesters are used as crystalline polyesters, it is preferable to prepare a crystalline polyester mixture by thermally melting and kneading the two or more crystalline polyesters.

In the thermal melting and kneading of the crystalline polyester or the crystalline polyester mixture and the amorphous polyester mixture, the kneading is preferably performed at the following temperature, that is, the kneading is preferably performed at a temperature equal to or higher than the highest melting point so that the polyester having the highest melting point among the crystalline polyester and the amorphous polyester contained in the resin mixture is satisfactorily kneaded. The kneading method is not particularly limited, and a single-screw extruder, a biaxial kneading extruder, a Banbury mixer, a roll, a Brabender, a plastograph, a kneader, or the like can be used.

The thus obtained resin mixture is used to mold a test tube-shaped preform. Examples of the method of molding the preform include, but are not particularly limited to, the following method: as illustrated in FIG. 2, a method of molding a preform 205 having a predetermined shape by injecting a molten material of the resin mixture into a preform mold including a cavity mold 203 and a core mold 207 using an injection molding apparatus 201 and solidifying the molten material in the preform mold. Note that at this time, the temperature of the preform mold into which the molten material is injected is preferably, for example, 40° C. or less. The molten material injected into the mold is cooled and solidified in the mold, and the rapid cooling can prevent the crystallization of the crystalline polyester from proceeding.

By suppressing the crystallization of the crystalline polyester in the preform, the crystal orientation of the crystalline polyester in the biaxial direction in the stretch blow molding in the step (ii) can be more accurately controlled. In the preform formed through such a process, a phase containing carbon black and an amorphous polyester (hereinafter also referred to as a "CB-containing amorphous PES phase") is present in the crystalline polyester phase so as to extend in the form of a layer in the longitudinal direction of the preform.

Figure 3A:
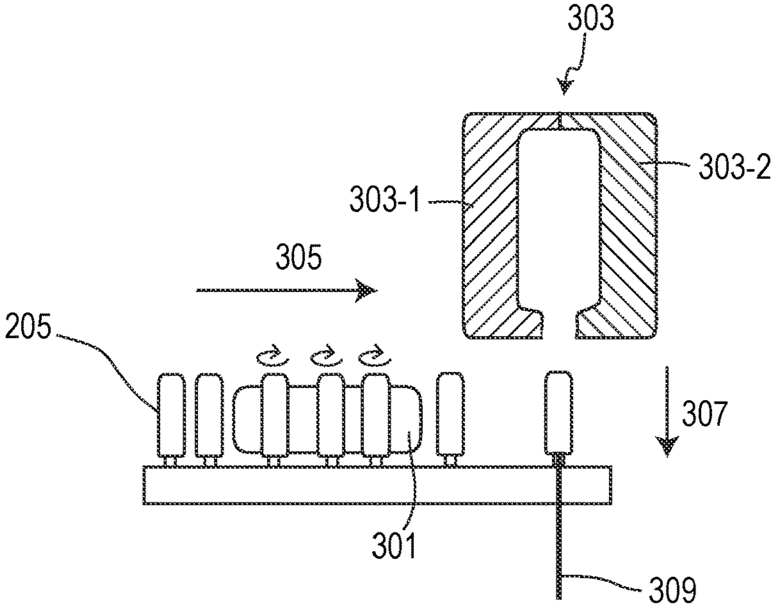
FIG. 3A is a schematic cross-sectional view of a primary blow molding apparatus used in Examples.
Figure 3B:
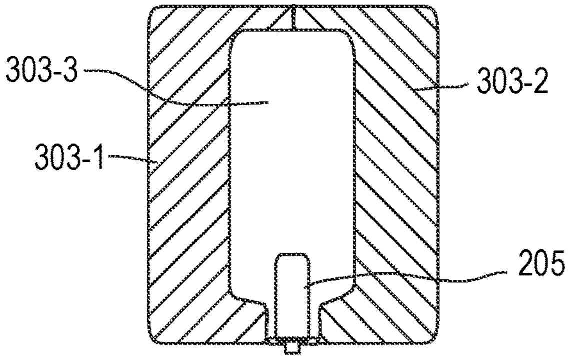
FIG. 3B is a schematic cross-sectional view of a primary blow molding apparatus used in Examples.

Next, in the step (ii), the preform is subjected to biaxial stretch blow molding. First, as illustrated in FIG. 3A, the preform 205 is placed in a heating furnace 301 and heated to a temperature at which the preform can be stretched. At this point, the heating time is preferably 1 minute or less. By setting the heating time to 5 minutes or less, the crystallization of the crystalline polyester in the preform during heating can be prevented from proceeding. The heated preform is conveyed in the direction of an arrow 305. Next, a blow mold 303 in which a cylindrical cavity 303-3 is formed by combining a left mold 303-1 and a right mold 303-2 is lowered in the direction of an arrow 307 from directly above the heated preform 205 and is disposed at the mouth portion of the blow mold 303 as illustrated in FIG. 3B.

Note that the heated preform is preferably installed in the mouth portion of the blow mold within a short time (for example, within 20 seconds) so that the temperature of the heated preform does not drop before the start of the next biaxial stretching step. As a result, the progress of the crystallization of the crystalline polyester in the preform due to slow cooling of the preform can be prevented. Note that the heating temperature of the preform may be calculated in advance, for example, by using a differential scanning calorimetry (DSC) to look at the endothermic peak and baseline shift of the resin mixture, which is a constituent material of the preform, upon heating, or may be determined from the glass transition temperature (Tg).

Figure 3C:
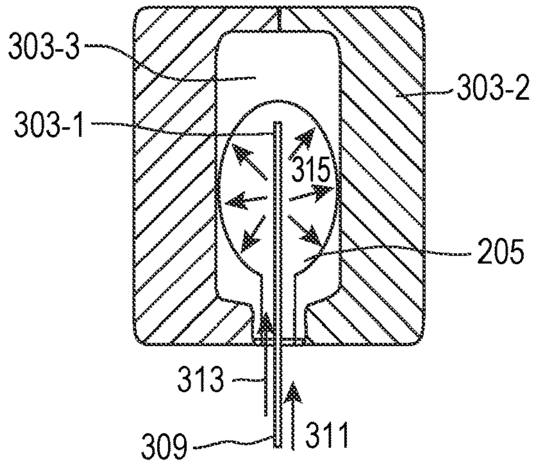
FIG. 3C is a schematic cross-sectional view of a primary blow molding apparatus used in Examples.

The heated preform 205 installed in the blow mold 303 is stretched in the longitudinal direction of the preform 205 by driving a stretching rod 309 in the direction of an arrow 311 as illustrated in FIG. 3C. This stretching is referred to as primary stretching. In addition, in synchronization with the driving of the stretching rod 309, a gas is caused to flow into the preform from the mouth portion of the preform 205 (arrow 313) to expand the preform in the circumferential direction thereof, which is referred to as secondary stretching. Examples of gases to be blown in include air, nitrogen, carbon dioxide and argon. As a result, the preform 205 expands in the respective directions indicated by arrows 315 in FIG. 3C, adheres to the inner walls of the cavity 303-3, and is cooled and solidified in this state. Next, by separating the left mold 303-1 and the right mold 303-2 of the blow mold 303, a molded article having a bottle shape (hereinafter, also referred to as a "blow bottle") is taken out from the blow mold 303. Through the biaxial stretch molding step, the CB-containing amorphous PES phase extending in the longitudinal direction in the preform is further stretched by the stretching in the longitudinal direction of the preform. The CB-containing amorphous PES phase is also stretched in the circumferential direction of the preform by the stretching in the circumferential direction of the preform. In other words, in the blow bottle, a disc-shaped CB-containing amorphous PES phase extending in the circumferential direction and the axial direction of the blow bottle is present in the phase of the crystalline polyester.

Figure 3D:
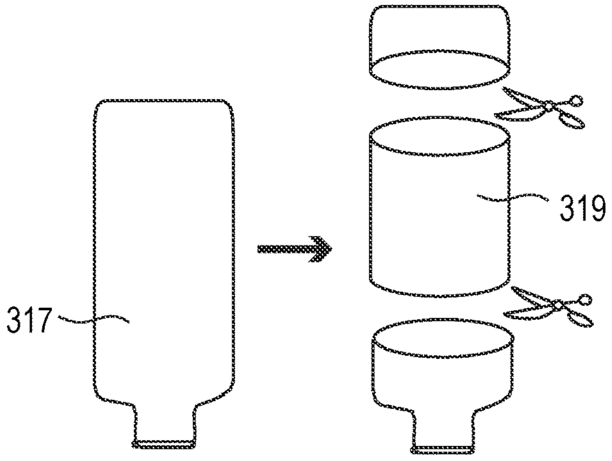
FIG. 3D is a schematic cross-sectional view of a primary blow molding apparatus used in Examples.

Next, as illustrated in FIG. 3D, the mouth side portion of the obtained blow bottle 317 and the upper end portion on the side opposite to the mouth side are cut to obtain a biaxially stretched cylindrical film 319 serving as a base layer.

Figure 4:
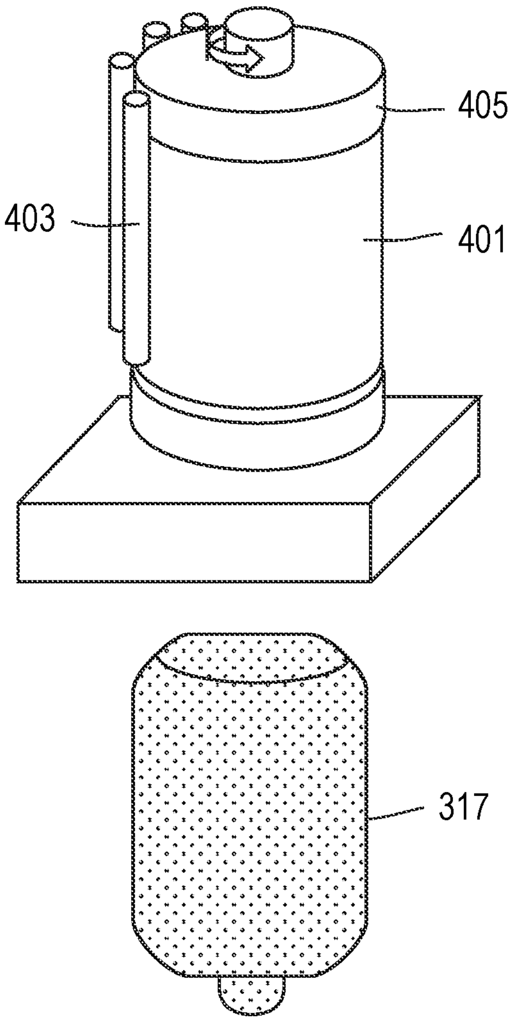
FIG. 4 is a schematic cross-sectional view of a secondary blow molding apparatus used in Examples.

Note that before the blow bottle 317 is cut, if necessary, a heating treatment may be performed to adjust the surface roughness of the outer peripheral surface of the blow bottle or to finely adjust the crystallinity of the crystalline polyester. Specifically, as illustrated in FIG. 4, the blow bottle 317 is placed in a cylindrical mold 401, and then the blow bottle is filled with a gas, for example. The mold 401 is then heated while being rotated by a roller-shaped heater 403 in contact with the outer peripheral surface of the mold 401 in a state in which outer molds are attached to the upper portion and the lower portion of the mold 401 so that the gas inside the blow bottle does not leak out. The heating temperature is, for example, about 130 to 190° C., and the heating time is, for example, such that the entire periphery of the blow bottle is uniformly heated for about 60 seconds.

In the biaxially stretched cylindrical film thus obtained, the carbon black is arranged in the circumferential direction and the axial direction, and the Fc1 and Φc1 and the Fc2 and Φc2 can be satisfied.

Here, it is preferable to use the crystalline polyester and the amorphous polyester in combination in order to biaxially stretch and mold a preform containing 2 parts by mass or more of carbon black. When carbon black is dispersed in a crystalline thermoplastic resin, the carbon black acts as a crystalline nucleus of the crystalline thermoplastic resin. Therefore, when a preform in which the carbon black is dispersed in the crystalline thermoplastic resin is biaxially stretched, spherulites of the crystalline thermoplastic resin rapidly grow with the carbon black becoming the crystalline nucleus, and the preform also becomes hard with the crystal growth. For this reason, the preform is easily broken during the stretching. However, when the amorphous polyester is used together with the crystalline polyester, the carbon black can be in a state of being unevenly distributed in the phase of the amorphous polyester. Since the carbon black in the phase of the amorphous polyester is not in direct contact with the crystalline polyester, the crystallization of the crystalline polyester resin can be suppressed in the biaxial stretching step. On the other hand, although the amorphous polyester is incompatible with the crystalline polyester, since both have an ester bond, the affinity is relatively high, and even in the process of biaxial stretching, breakage at the interface between the amorphous polyester phase and the crystalline polyester phase is less likely to occur. The amorphous polyester phase is then stretched in the biaxial direction while still containing carbon black. Therefore, it is considered that in the biaxially stretched cylindrical film obtained by the biaxial stretching, an electro-conductive path of carbon black is formed in the amorphous polyester phase stretched in the biaxial direction. Accordingly, it is considered that the environmental dependence of the surface resistivity can be reduced. In addition, the crystalline polyester has excellent strength by being stretched in the longitudinal direction and the circumferential direction of the preform, whereby the crystals are oriented in the respective directions. Moreover, the interface between the phase containing the crystalline polyester and the phase containing the amorphous polyester according to the present disclosure is less likely to be peeled off compared to the interface between the phase containing the polyether ester amide and the phase containing the crystalline polyester in the biaxially stretched cylindrical film according to Japanese Patent Application Laid-Open No. 2006-233150. Thus, the inner circumferential surface of the biaxially stretched cylindrical film according to one aspect of the present disclosure can exhibit excellent abrasion resistance.

The tensile elastic modulus in the circumferential direction, Ep, and the tensile elastic modulus in the direction perpendicular to the circumferential direction, Ea, of the cylindrical film are both preferably 1000 MPa or more. As described above, the electrophotographic belt is stretched by a plurality of rollers with a predetermined tensile force in the electrophotographic image forming apparatus, and elongation and breakage can be prevented by setting Ep to 1000 MPa or more. In addition, when a predetermined tensile force is applied in the circumferential direction, a compressive force is applied in the direction perpendicular to the circumferential direction of the electrophotographic belt. However, by setting Ea to 1000 MPa or more, wrinkling of the outer surface of the electrophotographic belt along the circumferential direction due to the compressive force can be more reliably suppressed. The above tensile elastic modulus can be controlled by the degree of orientation of the crystalline polyester in the circumferential direction of the cylindrical film and in the direction perpendicular to the circumferential direction. Then, the degree of the orientation of the crystalline polyester can be represented by the shrinkage ratio in the circumferential direction, $\alpha p$, and the shrinkage ratio in the direction perpendicular to the circumferential direction (axial direction), $\alpha a$, of the cylindrical film. Both $\alpha p$ and $\alpha a$ of the cylindrical film are preferably 2.0% or more. The cylindrical film having $\alpha p$ and $\alpha a$ of 2.0% or more has crystalline polyester sufficiently oriented in the circumferential direction and in the direction perpendicular to the circumferential direction, which means that deformation of the belt can be suppressed by the effect of shrinkage stress when the belt is stretched. The cylindrical film having such a shrinkage ratio can have the above tensile elastic moduli Ep and Ea of 1000 MPa or more. Note that methods of measuring Ep, Ea, $\alpha p$ and $\alpha a$ will be described in detail in Examples.

In addition, since the biaxially stretched cylindrical film obtained by the above method can effectively form an electro-conductive path by carbon black in the circumferential direction and the axial direction thereof, sufficient electro-conductivity can be exhibited without using an ionic electro-conductive agent. Accordingly, the biaxially stretched cylindrical film can extremely reduce the environmental dependency of electro-conductivity.

Here, the surface resistivity in the circumferential direction, Ap, measured on the inner circumferential surface of the cylindrical film according to the present aspect in an environment of a temperature of 23° C. and a relative humidity of 50% is preferably, for example, 1.0×10 3 Ω/□ or more and 1.0×10 13 Ω/□ or less. Particularly, the surface resistivity Ap is preferably 1.0×10 5 Ω/□ or more and $1.1\times10^{10}$ Ω/□ or less. When the electrophotographic belt is used as, for example, an intermediate transfer belt, by setting the surface resistivity Ap in the circumferential direction of the inner circumferential surface within the above range, it is possible to cause a current to flow more satisfactorily in the circumferential direction of the inner circumferential surface.

The ratio of the surface resistivity (Ap/Bp) is preferably 3.00 or less. Bp (Ω/□) is the surface resistivity in the circumferential direction measured on the inner circumferential surface of the cylindrical film which has been left to stand for 24 hours under an environment of a temperature of 30° C. and a relative humidity of 80%, (Ap/Bp) is preferably 3.0 or less. As described above, the cylindrical film according to the present disclosure contributes to stable formation of a high-quality electrophotographic image even in a high-temperature and high-humidity environment or a low-temperature and low-humidity environment by reducing the environmental dependence of the surface resistivity. (Ap/Bp) may preferably be 0.33-3.00, more preferably be 1.00-3.00, and still more preferably be 1.00-1.30.

Furthermore, the surface resistivity in the axial direction, Aa, measured on the inner circumferential surface of the cylindrical film according to the present aspect in an environment of a temperature of 23° C. and a relative humidity of 50% is preferably, for example, 1.0×10 3 Ω/□ or more and 1.0×10 13 Ω/□ or less. Particularly, the surface resistivity Aa is preferably 1.0×10 5 Ω/□ or more and $1.1\times10^{10}$ Ω/□ or less. Furthermore, the ratio of the surface resistivity (Aa/Ba) is preferably 3.00 or less. Ba (Ω/□) is the surface resistivity in the axial direction measured on the inner circumferential surface of the cylindrical film which has been left to stand for 24 hours under an environment of a temperature of 30° C. and a relative humidity of 80%. As described above, the cylindrical film according to the present disclosure contributes to stable formation of a high-quality electrophotographic image even in a high-temperature and high-humidity environment or a low-temperature and low-humidity environment by reducing the environmental dependence of the surface resistivity. (Aa/Ba) may preferably be 0.33-3.00, more preferably be 1.00-3.00, and still more preferably be 1.00-1.30.

The surface resistivities in the circumferential direction and the axial direction can be measured, for example, following Japanese Industrial Standard (JIS) K 6911:2006 except that a two-pin probe having two pins 20 mm apart from each other (2 mm in diameter) is used. When the surface resistivity in the circumferential direction is measured, the two-pin probe may be disposed on the inner circumferential surface of the cylindrical film such that the direction of a straight line (line segment) connecting the two pins is parallel to the circumferential direction. When the surface resistivity in the axial direction is measured, the two-pin probe may be disposed on the inner circumferential surface of the cylindrical film such that the direction of a straight line (line segment) connecting the two pins is parallel to the axial direction. As the two pin probe, for example, "UA" (trade name, manufactured by Nittoseiko Analytech Co., Ltd. (former name: Mitsubishi Chemical Analytech Co., Ltd.)) can be used.

The thickness of the cylindrical film according to the present disclosure is not particularly limited, but is preferably 40 μm to 500 μm, particularly preferably 50 to 100 μm from the viewpoint of ensuring flexibility because the cylindrical film is disposed in a bent state in the electrophotographic image forming apparatus.

<Crystalline Polyester>

The crystalline polyester can be obtained by polycondensation of a dicarboxylic acid and a diol, polycondensation of an oxycarboxylic acid or a lactone, or polycondensation using a plurality of these components, or the like. Additional multifunctional monomers may be used in combination. The crystalline polyester may be a homopolyester having one ester binding or may be a copolyester (copolymer) having a plurality of ester bonds.

Preferred examples of the crystalline polyester include at least one selected from the group consisting of polyalkylene terephthalate and polyalkylene naphthalate, which have high crystallinity and excellent heat resistance. In addition, copolymers with polyalkylene naphthalate and polyalkylene isophthalate can be suitably used.

The number of carbon atoms of alkylene in the polyalkylene terephthalate, the polyalkylene naphthalate, and the polyalkylene isophthalate is preferably 2 or more and 16 or less from the viewpoint of high crystallinity and heat resistance. More specifically, polyethylene terephthalate (PET), polyethylene naphthalate (PEN), polyethylene isophthalate, and copolymers containing these polymers are preferable as the crystalline polyester. These polymers may be used alone or in combination of two or more. The molecular weight of the crystalline polyester is not particularly limited. For example, in the case of PET, the preferred weight-average molecular weight is 50000 to 80000, and in the case of PEN, the preferred weight-average molecular weight is 20000 to 80000.

The content ratio of the crystalline polyester in the cylindrical film is preferably 50.0% by mass or more, more preferably 60.0% by mass or more, relative to the total mass of the thermoplastic resin composition. When the content ratio of the crystalline polyester is within the above range, a sufficient amount of the crystalline polyester can be oriented in the circumferential direction of the cylindrical film and in the direction perpendicular to the circumferential direction, and the mechanical strength of the cylindrical film can be more reliably enhanced.

<Amorphous Polyester>

The base layer may contain an amorphous polyester in order to improve moldability and arrangement of carbon black.

The amorphous polyesters contain polyesters having a monomer unit derived from at least one phthalic acid selected from the group consisting of terephthalic acid, orthophthalic acid and isophthalic acid, and a monomer unit derived from at least two diols selected from the group consisting of ethylene glycol, diethylene glycol, propylene glycol, neopentyl glycol and cyclohexanedimethanol.

Examples thereof include: a copolymer having an ethylene terephthalate unit and an ethylene orthophthalate unit and a polycondensate of the above-mentioned diol; and a copolymer having an ethylene terephthalate unit and an ethylene isophthalate unit and a polycondensate of the above-mentioned diol. These copolymers may be either block copolymers or random copolymers, and may be used as a mixture obtained by blending or alloying two or more copolymers.

Examples of the amorphous polyester that can be suitably used include amorphous polyesters having a monomer unit derived from terephthalic acid and a monomer unit of each of ethylene glycol and propylene glycol. Such amorphous polyesters are commercially available as “VYLON GK640” and “VYLON GK880” (both trade names, manufactured by TOYOBO CO., LTD.).

The chemical structure of the amorphous polyester resin can be identified by extracting and isolating the amorphous polyester from the base layer by an appropriate means such as dissolution in a solvent such as toluene or methyl ethyl ketone, and using thermal decomposition GC/MS, IR, NMR, or elemental analysis.

The content of the amorphous polyester is preferably 10.0% by mass or more and 100.0% by mass or less, particularly preferably 15.0% by mass or more and 35.0% by mass or less, relative to the content of the crystalline polyester. When the content of the amorphous polyester relative to the crystalline polyester is within the above range, an amorphous polyester phase including an electro-conductive path of carbon black can be formed in the biaxially stretched cylindrical film in an amount sufficient for exhibiting the above surface resistivity value.

<Carbon Black>

Examples of the carbon black include, but are not limited to, acetylene black, furnace black, channel black, thermal black and KETJENBLACK (R). The carbon black can be used alone or in combination of two or more.

Among the carbon blacks, a carbon black capable of forming a developed linked state, such as KETJENBLACK (R), is preferably used. The linked state of the carbon black can be evaluated by the DBP absorption.

The DBP absorption is a measure of a complex aggregation form (structure) due to chemical or physical bonding between carbon black particles, and is represented by the amount (mL) of dibutyl phthalate (DBP) that can be contained per 100 g of carbon black.

The larger the DBP absorption, the higher the structure. When carbon black is dispersed in a resin, electro-conductivity becomes high. In addition, the higher the structure, the lower the crystalline nucleus effect by carbon black. The molecular arrangement of the crystalline polyester is inhibited. Therefore, the present inventors believe that high-structured carbon black can suppress spherocrystal formation in crystalline polyesters and has better biaxial stretch moldability even when contained in high concentrations.

Thus, the DBP absorption of the carbon black is preferably 300 mL/100 g or more.

The DBP absorption of the carbon black in the base layer can be measured, for example, by the following method.

The interface of the base layer to which the carbon black is bound is eluted with a solvent or the like, the carbon black is taken out, and the carbon black is measured by using a known DBP absorption measuring apparatus.

The content of the carbon black in the base layer is set to 2.0% by mass or more based on the mass of the base layer from the viewpoint of imparting predetermined electro-conductivity to the base layer. The upper limit thereof is preferably 15.0% by mass or less from the viewpoint of strength of the biaxially stretched cylindrical film. In addition, the content of the carbon black is preferably within the range of 8.0 to 35.0% by mass relative to the mass of the amorphous polyester in the base layer. When the ratio of the carbon black relative to the mass of the amorphous polyester is within the above range, an electro-conductive path by the carbon black can be reliably formed in the phase of the amorphous polyester, and the surface resistivity of the base layer can be easily adjusted to be within the above range.

<Additive>

Other components may be added to the thermoplastic resin composition to the extent that the effects of the present disclosure are not impaired. Examples of such other components include an antioxidant, an ultraviolet absorber, an organic pigment, an inorganic pigment, a pH adjuster, a crosslinking agent, a compatibilizer, a release agent, a coupling agent and a lubricant. These additives can be used alone or in a combination of two or more. The amount of additives used can be appropriately set and is not particularly limited.

In addition, the base layer may contain an ionic electro-conductive agent to the extent that one of the effects of the present disclosure, for example, an effect of suppressing changes in surface resistivity due to environment is not impaired. For example, when the base layer contains an ionic electro-conductive agent, the toral amount of the ionic electro-conductive agent is preferably 2.0% by mass or less based on the mass of the base layer. By setting the content ratio of the ionic electro-conductive agent to 2.0% by mass or less, the environmental dependence of the surface resistivity of the base layer can be made almost negligible. In the present disclosure, it is more preferable that the cylindrical film does not contain an ionic electro-conductive agent. Therefore, the total amount of the ionic electro-conductive agent in the base layer is preferably 0.0% by mass or more and 2.0% by mass or less and particularly preferably 0.0% by mass or more and 0.5% by mass or less, based on the mass of the base layer.

<Surface Layer>

Examples of the surface layer including the electrophotographic belt having the configuration illustrated in FIG. 5B-1 include layers containing cured products of active energy beam-curable resins and having excellent abrasion resistance. Such a second layer can be provided, for example, by applying a composition containing an active energy beam-curable resin, such as a photocurable resin, onto the outer peripheral surface of the base layer, and curing the resin. The thickness of the surface layer is not particularly limited, but is preferably 1 to 5 μm, for example.

One example of the use of the electrophotographic belt according to the present disclosure includes, but is not limited to, an intermediate transfer belt. However, the electrophotographic belt can be applied to, for example, a conveyance belt that carries and conveys a recording medium such as paper.

<Electrophotographic Image Forming Apparatus>

An example of an electrophotographic image forming apparatus using the electrophotographic belt according to one aspect of the present disclosure as an intermediate transfer belt will be described below. As illustrated in FIG. 1, this electrophotographic image forming apparatus has a so-called tandem configuration in which electrophotographic stations of several colors are arranged in the rotational direction of the intermediate transfer belt. Note that symbols Y, M, C and k are given to configurations related to colors of yellow, magenta, cyan and black, respectively, but in the following description, the symbols may be omitted if their configurations are the same.

In FIG. 1, charging apparatuses 2Y, 2M, 2C and 2*k*, exposure apparatuses 3Y, 3M, 3C and 3*k*, developing apparatuses 4Y, 4M, 4C and 4*k*, and an intermediate transfer belt (intermediate transfer body) 6 are disposed around photosensitive drums (photosensitive members and image carrying members) 1Y, 1M, 1C and 1*k*. Each photosensitive drum 1 is rotatably driven in the direction of the arrow F (counterclockwise direction) at a predetermined circumferential speed (process speed). Each charging apparatus 2 charges the circumferential surface of the corresponding photosensitive drum 1 to a predetermined polarity and a predetermined potential (primary charge). A laser beam scanner as each exposure apparatus 3 outputs laser light on/off modulated corresponding to the image information input from an external apparatus such as an image scanner or a computer (not illustrated) to perform scan and exposure on the charged surface of the photosensitive drum 1. As a result of this scan and exposure, an electrostatic latent image corresponding to the target image information is formed on the surface of the photosensitive drum 1.

The developing apparatuses 4Y, 4M, 4C and 4*k* contain the toners of color components of yellow (Y), magenta (M), cyan (C) and black (k), respectively. The developing apparatus 4 to be used is selected based on the image information to develop the developer (toner) on the surface of the photosensitive drum 1. Thus, the electrostatic latent image is visualized as a toner image. A reversal development method of developing the toner applied to exposed portions of the electrostatic latent image is employed in the present embodiment. Moreover, such a charging apparatus, exposure apparatus and developing apparatus constitute an electrophotographic image forming unit.

In addition, the intermediate transfer belt 6 is composed of an endless-shaped electrophotographic belt. The intermediate transfer belt 6 is stretched by a plurality of rollers 20, 21 and 22 so that the outer peripheral surface thereof comes into contact with the surface of the photosensitive drum 1. In the present embodiment, the roller 20 is a tension roller for controlling the tension of the intermediate transfer belt 6 to be constant, the roller 22 is a drive roller for the intermediate transfer belt 6, and the roller 21 is an opposing roller for secondary transfer. The intermediate transfer belt 6 is then rotated in the direction of the arrow G by the drive of roller 22. In addition, each of primary transfer rollers 5Y, 5M, 5C and 5*k* is disposed at primary transfer positions facing the photosensitive drum 1 with the intermediate transfer belt 6 interposed therebetween.

The unfixed toner images of each color formed on photosensitive drum 1 are sequentially and electrostatically primary-transferred onto the intermediate transfer belt 6 by applying a primary transfer bias having a polarity opposite to the charging polarity of the toner to the primary transfer roller 5 with a constant voltage source or constant current source, which are not illustrated. Then, a full-color image in which four colors of unfixed toner images are superposed on the intermediate transfer belt 6 is obtained. The intermediate transfer belt 6 rotates while carrying the toner image transferred from the photosensitive drum 1 in such a manner. At each rotation of the photosensitive drum 1 that has been primary-transferred, the surface of the photosensitive drum 1 is cleaned with the transfer residual toner removed by a cleaning device 11, and the image-forming step is repeated.

In addition, at the secondary transfer position of the intermediate transfer belt 6 facing the conveyance path of a recording material 7 as the transfer medium, a secondary transfer roller (transfer portion) 9 is pressure-welded on the toner image carrying surface side of the intermediate transfer belt 6. Moreover, on the back surface side of the intermediate transfer belt 6 at the secondary transfer position, arranged is a counter roller 21 that serves as a counter electrode of the secondary transfer roller 9 and to which the bias is applied. When the toner image on the intermediate transfer belt 6 is transferred to a recording material 7, a bias having the same polarity as the toner, for example, −1000 to −3000 V is applied to the counter roller 21 by a transfer bias applying unit 28, and then a current of −10 to 50 μA flows. This transfer voltage is detected by a transfer voltage detecting unit 29. Furthermore, on the downstream side of the secondary transfer position, a cleaning device (belt cleaner) 12 for removing the toner remaining on the intermediate transfer belt 6 after the secondary transfer is provided.

The recording material 7 is conveyed in the direction of an arrow H through a conveyance guide 8, and is introduced to the secondary transfer position. The recording material 7 introduced to the secondary transfer position is nipped and conveyed to the secondary transfer position, and a constant voltage bias (transfer bias) being controlled to a predetermined value is applied to the counter roller 21 of the secondary transfer roller 9 by the secondary transfer bias applying unit 28. Applying a transfer bias having the same polarity as the toner to the counter roller 21 collectively transfers onto the recording material 7 a four-color full-color image (toner image) superposed on the intermediate transfer belt 6 at the transfer site, and thus a full-color unfixed toner image is formed on the recording material. The recording material 7 to which the toner image has been transferred is introduced into a fuser, which is not illustrated, and heat-fixed.

According to one aspect of the present disclosure, an electrophotographic belt having an electro-conductive inner circumferential surface that is resistant to abrasion even after long-term use can be provided. According to another aspect of the present disclosure, an electrophotographic image forming apparatus capable of stably forming a high-quality electrophotographic image can be provided.

EXAMPLES

The present disclosure will be specifically described below with reference to Examples and Comparative Examples, but the present disclosure is not limited thereto. Materials used in production of the cylindrical films according to Examples and Comparative Examples are listed below.

TABLE 1

| Abbreviation | Material name (trade name, etc.) |
|---|---|
| Crystalline polyester 1 (cPES1) | Polyethylene terephthalate (trade name: TRN-8550FF, manufactured by TEIJIN LIMITED) |
| Crystalline polyester 2 (cPES2) | Polyethylene naphthalate (trade name: TN-8050SC, manufactured by TEIJIN LIMITED) |
| Ionic electro-conductive agent (IC) | Lithium bis(trifluoromethanesulfonyl)imide (trade name: EF-N115, manufactured by Mitsubishi Materials Electronic Chemicals Co., Ltd.) |
| Non electro-conductive elastomer (ES1) | Styrene-butadiene copolymer (trade name: Tuftec M1913, manufactured by Asahi Kasei Corporation) |

TABLE 2

| Abbreviation | Material name (trade name, etc.) |
|---|---|
| Amorphous polyester 1 (aPES1) | Amorphous polyester (trade name: VYLON GK640, manufactured by TOYOBO CO., LTD.) |
| Amorphous polyester 2 (aPES2) | Amorphous polyester (trade name: VYLON GK880, manufactured by TOYOBO CO., LTD.) |
| Carbon black 1 (CB1) | KETJEN BLACK (trade name: EC300J, manufactured by LION SPECIALTY CHEMICALS CO., LTD.) |
| Carbon black 2 (CB2) | KETJEN BLACK (trade name: EC600JD, manufactured by LION SPECIALTY CHEMICALS CO., LTD.) |
| Carbon black 3 (CB3) | Carbon black (trade name: TOKABLACK #5500, manufactured by Tokai Carbon Co., Ltd.) |
| Ionic electro-conductive elastomer (ES2) | Polyether ester amide (trade name: PELESTAT NC6321, manufactured by Sanyo Chemical Industries, Ltd.) |

TABLE 3

| Abbreviation | Material name (trade name, etc.) |
|---|---|
| AN | Dipentaerythritol penta-/hexa-acrylate (trade name: ARONIX M-402, manufactured by Toagosei Co., Ltd.) |
| PTFE | PTFE particle (trade name: Lubron L-2, manufactured by Daikin Industries, Ltd.) |

TABLE 3-continued

| Abbreviation | Material name (trade name, etc.) |
|---|---|
| GF | PTFE particle dispersant (trade name: GF-300, manufactured by Toagosei Co., Ltd.) |
| SL | Zinc antimonate particle slurry (trade name: CELNAX CX-Z400K, manufactured by Nissan Chemical Corporation, 40% by mass in terms of zinc antimonate particle component) |
| IRG | Photopolymerization initiator (trade name: Irgacure 907, manufactured by BASF Corporation) |

(Measurement Method and Evaluation Method of Characteristic Value)

Methods of measuring and evaluating characteristic values of cylindrical films according to Examples and Comparative Examples are as the following (1) to (7).

(Evaluation 1) Evaluation of Surface Resistivity (1-1) Measurement of Surface Resistivities in Circumferential Direction, Ap and Bp The surface resistivity in the circumferential direction of the inner circumferential surface of the cylindrical film was measured by following a method according to JIS-K6911 as described below. A high resistivity meter (trade name: Hiresta-UP MCP-HT450, manufactured by Nittoseiko Analytech Co., Ltd. (former name: Mitsubishi Chemical Analytech Co., Ltd.)) was used as a measuring apparatus. In addition, a 2-pin probe (trade name: UA manufactured by Mitsubishi Chemical Analytech Co., Ltd.) was used as a probe. The probe was disposed on the inner circumferential surface of the cylindrical film so that the direction of a straight line (line segment) connecting the two pins was parallel to the circumferential direction of the cylindrical film. Note that the surface resistivity is defined as a surface resistivity value per unit area (1 $cm^2$) of the electrophotographic belt, and the unit is [Ω/□].

First, the produced cylindrical film was left to stand for 24 hours in an environmental test chamber controlled at a temperature of 23° C. and a relative humidity of 50%. Thereafter, a direct-current voltage of 250 V was applied between the two pins of the probe for 10 seconds under an environment of a temperature of 23° C. and a relative humidity of 50% to measure the surface resistivity in the circumferential direction of the cylindrical film. The surface resistivity was measured at the following four sites (four points) on the inner circumferential surface of the cylindrical film, and the average value of the obtained surface resistivities was defined as the surface resistivity in the circumferential direction, Ap, at normal temperature and normal humidity.

Measurement site (measurement point) of surface resistivity:

two points ±110 mm from a middle point in an axial direction toward both ends in the axial direction at a position determined as a reference in the circumferential direction of the cylindrical film (hereinafter, referred to as a "reference position"), and two points ±110 mm from the middle point in the axial direction at a position of 180° in the circumferential direction from the reference position toward both ends in the axial direction, that is, a total of four points.

Similarly, the cylindrical film was left to stand for 24 hours in an environmental test chamber controlled at a temperature of 30° C. and a relative humidity of 80%. Thereafter, the surface resistivity was measured at four sites in the same manner as described above under an environment of a temperature of 30° C. and a relative humidity of 80%. Then, the average value of the obtained surface resistivities was defined as the surface resistivity Bp at high temperature and high humidity. From the obtained Ap and Bp, Ap/Bp was calculated and then used as an index of environmental variation of the surface resistivity value in the circumferential direction of the inner circumferential surface due to temperature and humidity.

(1-2) Measurement of Surface Resistivities in Axial Direction, Aa and Ba

The surface resistivities Aa and Ba were measured in the same manner as in the method of measuring the surface resistivities Ap and Bp, except that the 2-pin probe was disposed so that the direction of the straight line (line segment) connecting the two pins was parallel to the axial direction in the method of measuring the surface resistivities Aa and Ba described in (1-1) above. Then, from the obtained Ap and Bp, Ap/Bp was calculated and then used as an index of environmental variation of the surface resistivity value in the circumferential direction of the inner circumferential surface due to temperature and humidity.

(Evaluation 2) Evaluation of Tensile Elastic Modulus

The tensile elastic modulus was measured in an environment of a temperature of 23° C. and a relative humidity of 50% using a low-load universal material tester (trade name: 34TM-5, manufactured by Instron) equipped with a 5 kN load cell. A test piece 1 having a 100 mm in the circumferential direction ×20 mm in the axial direction and a test piece 2 having a 20 mm in the circumferential direction ×100 mm in the axial direction were cut out from the produced cylindrical film. Each test piece was gripped by a pneumatic grip with a chuck-to-chuck distance of 50 mm. The gripped test piece was pulled at a constant speed of 5 mm/min. Based on the obtained stress-strain curve and thickness of the electrophotographic belt, the tensile elastic modulus was calculated from a stress value at 0.25% strain. The average values were determined from measurement results of five test pieces cut out from the same cylindrical film, and were defined as the tensile elastic modulus in the circumferential direction, Ep, and the tensile elastic modulus in the axial direction, Ea, of the cylindrical film.

(Evaluation 3) Evaluation of Shrinkage Ratio

As an index of shrinkage stress of the cylindrical film, the shrinkage ratio was measured by the following method using a thermomechanical analyzer (trade name: TMA/SDTA841, manufactured by Mettler Toledo International Inc.) under the following measurement conditions to measure the change in the chuck-to-chuck distance as a dimensional change of the sample.

Test pieces having a 5 mm in the circumferential direction ×20 mm in the axial direction and a 20 mm in the circumferential direction ×5 mm in the axial direction were cut out from the produced cylindrical film and used.

The test pieces were gripped with a chuck-to-chuck distance of 10 mm and a load of 0.01 N, held at 25° C. for 10 minutes, and heated to a temperature 10° C. higher than glass-transition temperature of a thermoplastic resin composition at 5° C./min. After being held for 30 minutes, the test pieces were cooled again to 25° C. at 5° C./min.

The shrinkage ratio α (unit: %) was calculated by the following equation, where x1 is defined as the chuck-to-chuck distance before the temperature rise and x2 is defined as the chuck-to-chuck distance at the end of the temperature rise.

$$\alpha=(x1-x2)/x1\times100$$

The average values were determined from the measurement results of five test pieces cut out from the same cylindrical film, and were defined as the shrinkage ratio in the circumferential direction, αp, and the shrinkage ratio in the direction perpendicular to the circumferential direction, aa, of the cylindrical film. Note that when expansion occurred, the value of the shrinkage ratio was expressed as minus.

(Evaluation 4) Evaluation of DBP Absorption

The DBP absorption of carbon black contained in the produced cylindrical film was measured by the following method. A pulverized product of 100 test pieces of 2 mm×2 mm cut out from the cylindrical film was immersed in toluene heated to a temperature of 50° C. and left to stand for 48 hours to dissolve the amorphous polyester in the sample pieces. Then, the carbon black contained in the amorphous polyester phase was extracted. The DBP absorption of carbon black filtered from the solution was measured using an absorption measuring apparatus (trade name: S-500, manufactured by Asahisouken Co., Ltd.). Specifically, 10 g of the collected carbon black was put into a measurement chamber, and torque was then measured in setting of a DBP (dibutyl phthalate) dropping rate of 4 mL/min and a rotor rotational speed of 125 rpm. The DBP absorption can be defined by the amount of DBP dropped and a sample volume at which the torque has 70% of the peak torque value.

Note that when the amount of carbon black required for the measurement of the DBP absorption cannot be obtained from 100 sample pieces, the required amount of carbon black may be obtained by increasing the number of samples to be collected and then performing the above operation.

(Evaluation 5) Evaluation of Average Degree of arrangements of Carbon Black, Fc1 and Fc2, and Average Arrangement Angles of Carbon Black, Φc1 and Φc2

A sample having a length of 5 mm in the circumferential direction, a length of 5 mm in a direction perpendicular to the circumferential direction (axial direction) and a thickness equal to the total thickness of the produced biaxially stretched cylindrical film was cut out from any position of the cylindrical film using the following section making apparatus.

Section making apparatus (trade name: Cryomicrotome, manufactured by Leica Microsystems)

In this sample, a first cross section in a direction along the thickness-circumferential direction of the biaxially stretched cylindrical film and a second cross section in a direction along the thickness-axial direction of the biaxially stretched cylindrical film were confirmed. Each of the first cross section and the second cross section was subjected to polishing with an ion beam. A cross section polisher (trade name: SM09010, manufactured by JEOL Ltd.) was used in the polishing. In the polishing, each cross section was irradiated with an ion beam for 11 hours under an argon gas atmosphere with an applied voltage set to 4.5 V.

The polished first cross section and second cross section were dyed with ruthenium tetroxide.

Next, the dyed first cross section was observed with a scanning electron microscope (SEM), and an image (SEM image) of a square observation region of 5 μm in length ×5 μm in width was obtained at a predetermined position of the first cross section. At that point, the longitudinal direction of the SEM image was adjusted to be parallel to the thickness direction of the cylindrical film, and the transverse direction of the SEM image was adjusted to be parallel to the circumferential direction of the cylindrical film. The resolution was set to a resolution sufficient to analyze carbon black appearing in the first cross section (for example, 2000 pixels in length ×2000 pixels in width). The obtained SEM image was then binarized such that the carbon black became white while the binder was black to obtain a binarized image. Image processing software (trade name: ImageJ, manufactured by National Institutes of Health) was used for the binarization processing. Next, the obtained binarized image was subjected to a two-dimensional Fourier transform, the power spectrum was integrated in the circumferential direction of the cylindrical film, and an ellipse plot indicating the direction and degree of arrangement of the carbon black in the circumferential direction was obtained (see FIG. 7A). From the obtained elliptic plot, the degree of arrangement of the carbon black, fc1, and the arrangement angle thereof, ϕc1, in the first cross section were determined. This operation was performed on a total of 20 samples collected from any position of the biaxially stretched cylindrical film to calculate the average values Fc1 and Φc1 of the degree of arrangement fc1 and the arrangement angle ϕc1 of each sample.

In addition, fc2 and ϕc2 were determined for the second cross section of the sample in the same manner as described above, and the average degree of arrangement Fc2 and the average arrangement angle Φc2 were further calculated.

(Evaluation 6) Evaluation of Abrasion Loss

A friction tester (trade name: FPR-2100, manufactured by RHESCA Co., LTD.) was used to measure the abrasion loss on the inner circumferential surface of the electrophotographic belt. A high-density felt (trade name: ½" abrasive stick CS-7 (Felt), manufactured by TABER INDUSTRIES) was used as a contact.

Sample pieces of 50 mm in the circumferential direction and 50 mm in the axial direction perpendicular to the circumferential direction were cut out from any 20 sites of the electrophotographic belt, and the contact fixed to measurement terminal are brought into contact with the inner circumferential surface of the electrophotographic belt.

In order to apply a load between the contact and the sample pieces in an environment of a temperature of 23° C. and a relative humidity of 50%, a 400 g weight was fixed on the measurement terminal to which the contact was fixed. Thereafter, a linear reciprocating motion was performed under conditions of a linear speed of 50 mm/sec, a reciprocating distance of 10 mm and a reciprocating number of 100,000 to perform a abrasion test.

The weight of the sample pieces was measured before the abrasion test, and the difference in weight from the sample pieces from which the abrasion powder generated after the abrasion test was removed was defined as an abrasion loss L, and the total abrasion loss resulting from the 20 abrasion tests was defined as an abrasion loss Lt.

(Evaluation 7) Digital Reproducibility of Electrophotographic Image Forming Apparatus (Evaluation of Scattering Image)

An electrophotographic image forming apparatus having the configuration illustrated in FIG. 1 was used, an intermediate transfer belt as an electrophotographic belt was mounted, and the electrophotographic image forming apparatus was left to stand for 24 hours in an environmental test chamber controlled at a temperature of 30° C. and a relative humidity of 80%. Thereafter, an unfixed image at the time when a fine line image (30 lines/5 mm) was transferred onto paper was output and then fixed without applying pressure using an oven at 100° C. to obtain an image. The image was observed using a loupe, and the number of fine line images with toner scattering was evaluated.

Example 1

(Production of Biaxially Stretched Cylindrical Film)

<Preparation of Amorphous Polyester Mixture>

A pre-blended sample was prepared by mixing aPES1 and CB1 listed in Table 2 at a blending ratio listed in Table 4. This pre-blended sample was thermally melted and kneaded by using a biaxial extruder (trade name: TEX30α, manufactured by The Japan Steel Works, Ltd.) to prepare an amorphous polyester mixture. The thermal melting and kneading temperature was adjusted so as to fall within the range of 190° C. or more and 270° C. or less, and the thermal melting and kneading time was set to 3 to 5 minutes. The obtained amorphous polyester mixture was pelleted and dried at a temperature of 90° C. for 10 hours.

<Preparation of Crystalline Polyester>

Pellets of cPES1 in Table 1 was dried at a temperature of 140° C. for 10 hours.

Next, the pellets of cPES1 and pellets of the amorphous polyester mixture were put into an injection molding apparatus (trade name: SE180D, manufactured by Sumitomo Heavy Industries, Ltd.) so as to obtain the blending ratio listed in Table 4. Then, the pellets were subjected to injection molding with a test tube-shaped mold adjusted to a temperature of 30° C., with a cylinder setting temperature being 250 to 300° C., to produce a preform. The obtained preforms had a test tube shape with an outer diameter of 50 mm, an inner diameter of 46 mm, a length of 150 mm and a thickness of 2 mm.

Next, the preform was stretched longitudinally and circumferentially in two axial directions using a biaxial stretch forming apparatus. First, as illustrated in FIG. 3A, a preform 205 was placed in a heating apparatus 301 including a non-contact heater (not illustrated) for heating the preform 205, and the preform was heated by the heater so as to have an outer surface temperature of 120 to 160° C.

Then, a blow mold 303 maintained at a mold temperature of 30° C. was lowered in the direction of an arrow 307 toward the heated preform 205, and the heated preform 205 was disposed at a mouth portion of the blow mold 303 (FIG. 3B). Next, as illustrated in FIG. 3C, a stretching rod 309 was driven in the direction of an arrow 311, and simultaneously with the start of driving of the stretching rod, air adjusted at a temperature of 23° C. was introduced into the preform 205 from the mouth portion thereof as illustrated by an arrow 313 in FIG. 3C. In this manner, the preform 205 was stretched in the biaxial direction and adhered to the inner wall of the blow mold. Note that the driving speed of the stretching rod 309 was 2.0 m/sec, and the pressure of the air introduced into the blow bottle was 0.5 MPa.

Subsequently, a left mold 303-1 and a right mold 303-2 of the blow mold 303 were separated from each other, and a bottle-shaped molded product (blow bottle) 317 was taken out from the blow mold 303.

Next, the obtained blow bottle 317 was set in a cylindrical mold 401 made of nickel and produced by an electroforming method shown in FIG. 4, and an outer mold 405 was attached thereto. Air pressure of 0.1 MPa was applied to the inside of the blow bottle, and the outer peripheral surface of the blow bottle 317 was adhered to the inner peripheral surface of the cylindrical mold by adjusting so that air did not leak to the outside. Furthermore, the entire circumference of the blow bottle was uniformly heat-treated at 130 to 190° C. for 60 seconds using a heating heater 403 while the cylindrical mold 401 made of nickel was rotated at a constant speed of 2 rotations/sec.

Thereafter, air at a temperature of 25° C. was blown to the cylindrical mold made of nickel to cool the mold to room temperature (25° C.), the air pressure applied to the inside of the blow bottle 317 was released, and the blow bottle 317 whose dimensions were improved by annealing was obtained. From the dimensions of the preform 205 and the blow bottle 317, the biaxial stretch ratio was 4.0 times in the transverse stretch ratio (circumferential direction) Lp and 4.3 times in the longitudinal stretch ratio (direction perpendicular to the circumferential direction) La.

Subsequently, as illustrated in FIG. 3D, a portion on the mouth side of the blow bottle 317 and a portion on the opposite side to the mouth side were cut to produce a cylindrical film having a circumferential length of 630 mm, a width of 250 mm and a thickness of 70 μm.

(Preparation of Surface Layer Coating Liquid)

The acrylic resin compositions listed in Table 3 were weighed at a ratio of AN/PTFE/GF/SL/IRG=66/20/1.0/12/1.0 (mass ratio in terms of solid content) and subjected to a rough dispersion treatment to obtain solutions. The obtained solutions were dispersed using a high-pressure emulsion dispersion machine (trade name: Nanovater, manufactured by YOSHIDA KIKAI CO.,LTD.). The main dispersion treatment was performed until a 50% average particle diameter of the PTFE contained was 200 nm. The obtained dispersion liquid was used as a surface layer coating liquid.

(Formation of Surface Layer)

The base layer was fitted on an outer periphery of a cylindrical mold (circumferential length of 630 mm), and ends thereof were sealed. Then, the base layer was soaked in a container filled with the surface layer coating liquid together with the mold and pulled up so that the relative speed of the liquid surface of a curable composition and the base layer of the electrophotographic belt became constant. Thus, a coating film composed of the coating liquid was formed on the surface of the base layer of the electrophotographic belt. A pull-up speed (relative speed of the liquid surface of the curable composition and the base layer of the electrophotographic belt) and a solvent ratio of the curable composition are adjusted depending on the intended film thickness of the surface layer.

In this Examples, the pull-up speed was set to 10 to 50 mm/sec, and the film thickness of the surface layer was adjusted to about 3 μm. In this Example, the coating direction refers to a direction opposite to the direction in which the base layer of the electrophotographic belt is pulled up. In other words, the first area pulled up from the coating liquid is the most upstream. The base layer of the electrophotographic belt coated with the coating liquid was removed from the cylindrical mold and dried in an environment of 23° C. under an exhaust atmosphere for 1 minute. The drying temperature and drying time are appropriately adjusted based on a solvent type, a solvent ratio and film thickness. Thereafter, the coating film was cured by being irradiated with ultraviolet light until an accumulated light quantity reached 600 $mJ/cm^2$ using a UV irradiator (trade name: UE06/81-3, manufactured by Eye Graphics Co., Ltd.).

The thickness of the surface layer was measured by a destructive inspection in which a base layer of an electrophotographic belt separately produced under the same conditions was cut, and a cross section thereof was observed with an electron microscope (trade name: XL30-SFEG, manufactured by FEI Company). As a result of the destructive inspection, the thickness of the surface layer was 2.8 μm. Thus, an electrophotographic belt in which the surface layer was formed on the outer peripheral surface of the base layer was obtained. This electrophotographic belt was subjected to the above-described (Evaluation 1) to (Evaluation 7). Note that the binarized images illustrated in FIGS. 6A and 6B were obtained from the cylindrical film produced in this Example.

Examples 2 to 6, 10 and 11

An electrophotographic belt was produced and evaluated in the same manner as in Example 1 except that the cPES species, the aPES species, the CB species and the blending ratio were as listed in Table 4.

Examples 7 to 9

<Preparation of Crystalline Polyester Mixture>

Pre-blended samples according to each Example were prepared by mixing aPES1 and ES1 at a blending ratio listed in Table 4. Each pre-blended sample was thermally melted and kneaded by using a biaxial extruder (trade name: TEX30α, manufactured by The Japan Steel Works, Ltd.) to obtain a crystalline polyester mixture according to each Example. The thermal melting and kneading temperature was adjusted so as to fall within the range of 220° C. or more and 300° C. or less, and the thermal melting and kneading time was set to 3 to 5 minutes. The obtained crystalline polyester mixture was pelleted and dried at a temperature of 140° C. for 10 hours.

<Preparation of Amorphous Polyester Mixture>

Pellets of the amorphous polyester mixture according to each of Examples 7 to 9 were prepared in the same manner as in the preparation of the amorphous polyester mixture of Example 1 except that the aPES species, the CB species and the blending ratio thereof were adjusted to the blending ratio listed in Table 4.

A preform was produced in the same manner as in Example 1 except that the pellets of the crystalline polyester mixture according to each Example, and the pellets of the amorphous polyester mixture were used. An electrophotographic belt according to each Example was also produced by producing a base layer and forming a surface layer in the same manner as in Example 1 except that the obtained preform was used. The obtained electrophotographic belt was subjected to Evaluation 1 to Evaluation 7.

Examples 12 to 16

<Preparation of Crystalline Polyester Mixture>

Pre-blended samples according to each Example were prepared by mixing cPES1 and cPES2 or cPES1, cPES2 and ES1 at a blending ratio listed in Table 4. These pre-blended samples were thermally melted and kneaded by using a biaxial extruder (trade name: TEX30α, manufactured by The Japan Steel Works, Ltd.) to obtain a crystalline polyester mixture according to each Example. The thermal melting and kneading temperature was adjusted so as to fall within the range of 220° C. or more and 300° C. or less, and the thermal melting and kneading time was set to 3 to 5 minutes. The obtained crystalline polyester mixture was pelleted and dried at a temperature of 140° C. for 10 hours.

<Preparation of Amorphous Polyester Mixture>

Pellets of the amorphous polyester mixture according to each Example were prepared in the same manner as in the preparation of the amorphous polyester mixture of Example 1 except that aPES1, aPES2, and CB1 or CB2 were mixed at a blending ratio listed in Table 4.

A preform was produced in the same manner as in Example 1 except that the pellets of the crystalline polyester mixture according to each Example and the pellets of the amorphous polyester mixture were used so as to have a blending ratio listed in Table 4. An electrophotographic belt according to each Example was also produced by producing a base layer and forming a surface layer in the same manner as in Example 1 except that the obtained preform was used. The obtained electrophotographic belt was subjected to Evaluation 1 to Evaluation 7.

Examples 17 to 19

<Preparation of Crystalline Polyester Mixture>

Pre-blended samples according to each Example were prepared by mixing cPES1 and IC at a blending ratio listed in Table 4. Each pre-blended sample was thermally melted and kneaded by using a biaxial extruder (trade name: TEX30α, manufactured by The Japan Steel Works, Ltd.) to obtain a crystalline polyester mixture according to each Example. The thermal melting and kneading temperature was adjusted so as to fall within the range of 220° C. or more and 300° C. or less, and the thermal melting and kneading time was set to 3 to 5 minutes. The obtained crystalline polyester mixture was pelleted and dried at a temperature of 140° C. for 10 hours.

<Preparation of Amorphous Polyester Mixture>

Pellets of the amorphous polyester mixture were prepared in the same manner as in Examples 1 to 3.

Subsequently, a preform was produced in the same manner as in Example 1 except that the pellets of the crystalline polyester mixture according to each Example, and the pellets of the amorphous polyester mixture were used. An electrophotographic belt according to each Example was also produced by producing a base layer and forming a surface layer in the same manner as in Example 1 except that the obtained preform was used. The obtained electrophotographic belt was subjected to Evaluation 1 to Evaluation 7.

line polyester mixture were used. Subsequently, this preform was subjected to biaxial stretch forming in the same manner as in Example 1.

However, since the hardness of the preform was high, stretching in the longitudinal direction and the circumferential direction could not be performed. Note that the DBP absorption of the carbon black in this Comparative Example was analyzed in the same manner as in the method described in Evaluation 4 in Example 1 except that a pulverized product of the sample collected from the preform subjected to biaxial stretch forming was used.

Comparative Examples 3 and 4

Pre-blended samples according to each Comparative Example were prepared by mixing aPES1 and CB1 at a blending ratio listed in Table 5. Pellets of the amorphous polyester mixture were obtained in the same manner as in Example 1 except that these pre-blended samples were used. A preform was produced in the same manner as in Example 1 except that only the pellets of this amorphous polyester mixture were used. Subsequently, this preform was subjected to biaxial stretch forming in the same manner as in Example 1.

As a result, although the preform was stretched in the longitudinal direction and the circumferential direction, a locally excessively stretched portion was generated, and the preform broke in this portion. Therefore, a blow bottle could not be obtained. The reason is considered to be because the preform was too soft since binder resin was composed only of the amorphous polyester. Note that the DBP absorption of the carbon black in this Comparative Example was analyzed in the same manner as in the method described in Evaluation 4 in Example 1 except that a pulverized product of the sample collected from a biaxially stretched formed product broken as a result of the biaxial stretch forming was used.

TABLE 4

| Material | Example | | | | | | | | | | | | | | | | | | |
|---|---|---|---|---|---|---|---|---|---|---|---|---|---|---|---|---|---|---|---|
| abbreviation | 1 | 2 | 3 | 4 | 5 | 6 | 7 | 8 | 9 | 10 | 11 | 12 | 13 | 14 | 15 | 16 | 17 | 18 | 19 |
| cPES1 (% by mass) | 78.0 | 68.0 | 56.0 | 75.0 | 61.0 | 52.0 | 75.0 | 59.0 | 50.0 | 0.0 | 0.0 | 63.5 | 32.0 | 8.0 | 15.0 | 20.0 | 77.9 | 67.7 | 55.5 |
| cPES2 (% by mass) | 0.0 | 0.0 | 0.0 | 0.0 | 0.0 | 0.0 | 0.0 | 0.0 | 0.0 | 75.5 | 54.0 | 10.0 | 20.0 | 60.0 | 40.0 | 30.0 | 0.0 | 0.0 | 0.0 |
| aPES1 (% by mass) | 20.0 | 28.0 | 38.0 | 0.0 | 0.0 | 0.0 | 0.0 | 0.0 | 0.0 | 0.0 | 0.0 | 8.0 | 14.0 | 4.0 | 6.0 | 6.0 | 20.0 | 28.0 | 38.0 |
| aPES2 (% by mass) | 0.0 | 0.0 | 0.0 | 23.0 | 35.0 | 42.0 | 16.0 | 26.0 | 30.0 | 22.0 | 40.0 | 16.0 | 26.0 | 18.0 | 22.0 | 24.0 | 0.0 | 0.0 | 0.0 |
| CB1 (% by mass) | 2.0 | 4.0 | 6.0 | 0.0 | 0.0 | 0.0 | 0.0 | 0.0 | 0.0 | 2.5 | 0.0 | 0.0 | 8.0 | 4.0 | 0.0 | 8.0 | 2.0 | 4.0 | 6.0 |
| CB2 (% by mass) | 0.0 | 0.0 | 0.0 | 2.0 | 4.0 | 6.0 | 4.0 | 7.0 | 10.0 | 0.0 | 6.0 | 2.5 | 0.0 | 0.0 | 7.0 | 0.0 | 0.0 | 0.0 | 0.0 |
| ES1 (% by mass) | 0.0 | 0.0 | 0.0 | 0.0 | 0.0 | 0.0 | 5.0 | 8.0 | 10.0 | 0.0 | 0.0 | 0.0 | 0.0 | 6.0 | 10.0 | 12.0 | 0.0 | 0.0 | 0.0 |
| IC (% by mass) | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.1 | 0.3 | 0.5 |

Comparative Examples 1 and 2

A pre-blended sample was prepared by mixing cPES1 and CB1 at a blending ratio listed in Table 5. Pellets of the crystalline polyester mixture were obtained in the same manner as in Example 7 except that this pre-blended sample was used. Next, a preform was produced in the same manner as in Example 1 except that only the pellets of this crystal-

Comparative Example 5

A pre-blended sample was prepared by mixing CB3 and ES2 at a ratio listed in Table 5. This pre-blended sample was melted and kneaded at a temperature of 210° C. using a kneader and then extruded to produce a sheet. The obtained sheet was cut to obtain pellets. A preform was produced in the same manner as in Example 1 except that the pellets, cPES1 and cPES2 were used at a blending ratio listed in Table 5. An electrophotographic belt according to this Example was also produced by producing a base layer and forming a surface layer in the same manner as in Example 1 except that the obtained preform was used. The obtained electrophotographic belt was subjected to Evaluation 1 to Evaluation 7.

Comparative Example 6

A pre-blended sample was prepared by mixing cPES1, cPES2, CB3 and ES2 at a ratio listed in Table 5. This pre-blended sample was thermally melted and kneaded by using a biaxial extruder (trade name: TEX30α, manufactured by The Japan Steel Works, Ltd.). The thermal melting and kneading temperature was adjusted so as to fall within the range of 220° C. or more and 300° C. or less, and the thermal melting and kneading time was set to 3 to 5 minutes. The obtained polyester mixture was pelleted and dried at a temperature of 140° C. for 10 hours.

A preform was produced in the same manner as in Example 1 using only the pellets of this polyester mixture. Subsequently, an electrophotographic belt according to this Comparative Example was produced by producing a base layer and forming a surface layer in the same manner as in Example 1 except that the obtained preform was used. The obtained electrophotographic belt was subjected to Evaluation 1 to Evaluation 7.

Comparative Example 7

A pre-blended sample was prepared by mixing cPES1, aPES1, IC and ES2 at a blending ratio listed in Table 5. This pre-blended sample was thermally melted and kneaded by using a biaxial extruder (trade name: TEX30α, manufactured by The Japan Steel Works, Ltd.). The thermal melting and kneading temperature was adjusted so as to fall within the range of 220° C. or more and 300° C. or less, and the thermal melting and kneading time was set to 3 to 5 minutes. The obtained polyester mixture was pelleted and dried at a temperature of 140° C. for 10 hours.

A preform was produced in the same manner as in Example 1 using only the pellets of this polyester mixture. Subsequently, an electrophotographic belt according to this Comparative Example was produced by producing a base layer and forming a surface layer in the same manner as in Example 1 except that the obtained preform was used. The obtained electrophotographic belt was subjected to Evaluation 1 to Evaluation 7.

Comparative Examples 8 to 10

Pellets of the amorphous polyester mixture were prepared in the same manner as in Examples 1 and 7.

The pellets of cPES1 and the pellets of each amorphous polyester mixture were used so as to have a blending ratio listed in Table 5, and melted and mixed using a biaxial kneading extruder (trade name: PCM43, manufactured by Ikegai Corp.) under the following conditions to produce a resin composition.

Extrusion rate: 6 kg/h

Screw rotational speed: 225 rpm

Barrel control temperature: 240° C.

The resulting resin composition was melt-extruded using an uniaxial extruder (manufactured by PLABOR Research Laboratory of Plastics Technology Co., Ltd.) with a spiral cylindrical die (inner diameter: 195 mm, slit width: 1.1 mm) at the tip under the following conditions to produce a cylindrical film having the following size. The thus obtained cylindrical film was used as an electrophotographic belt according to this Comparative Example.

Extrusion rate: 6 kg/h

Dies temperature: 260° C.

Size: outer diameter of 201 mm, thickness of 70 μm

The obtained electrophotographic belt was subjected to (Evaluation 1) to (Evaluation 7).

TABLE 5

| Material | Comparative Example | | | | | | | | | |
|---|---|---|---|---|---|---|---|---|---|---|
| abbreviation | 1 | 2 | 3 | 4 | 5 | 6 | 7 | 8 | 9 | 10 |
| cPES1 [% by mass] | 98.0 | 94.0 | 0.0 | 0.0 | 50.0 | 62.0 | 70.6 | 78.0 | 75.0 | 0.0 |
| cPES2 [% by mass] | 0.0 | 0.0 | 0.0 | 0.0 | 10.0 | 7.0 | 0.0 | 0.0 | 0.0 | 0.0 |
| aPES1 [% by mass] | 0.0 | 0.0 | 98.0 | 94.0 | 0.0 | 0.0 | 20.0 | 20.0 | 16.0 | 98.0 |
| CB1 [% by mass] | 2.0 | 6.0 | 2.0 | 6.0 | 0.0 | 0.0 | 0.0 | 2.0 | 0.0 | 2.0 |
| CB2 [% by mass] | 0.0 | 0.0 | 0.0 | 0.0 | 0.0 | 0.0 | 0.0 | 0.0 | 4.0 | 0.0 |
| CB3 [% by mass] | 0.0 | 0.0 | 0.0 | 0.0 | 25.0 | 16.0 | 0.0 | 0.0 | 0.0 | 0.0 |
| IC [% by mass] | 0.0 | 0.0 | 0.0 | 0.0 | 0.0 | 0.0 | 4.4 | 0.0 | 5.0 | 0.0 |
| ES2 [% by mass] | 0.0 | 0.0 | 0.0 | 0.0 | 15.0 | 15.0 | 5.0 | 0.0 | 0.0 | 0.0 |

The evaluation results of Examples 1 to 19 and Comparative Examples 1 to 10 are shown in Tables 6 to 8. In Tables 6 to 8, when a blow bottle could be molded by biaxially stretching the preform, "Y" was written in the column of "Possibility of biaxial stretching". On the other hand, when a blow bottle could not be molded due to breakage of the preform or the like in the process of biaxial stretching, "N" was written in the column of "Possibility of biaxial stretching". However, in Comparative Examples 8 to 10, since a cylindrical film was produced by extrusion molding, "–" was written in the column.

TABLE 6

| | Example | | | | | | | | | |
|---|---|---|---|---|---|---|---|---|---|---|
| | 1 | 2 | 3 | 4 | 5 | 6 | 7 | 8 | 9 | 10 |
| Transverse stretch ratio Lp [times] | 4.0 | 4.0 | 4.0 | 4.0 | 4.0 | 4.0 | 4.0 | 4.0 | 4.0 | 4.0 |
| Longitudinal stretch ratio La [times] | 4.3 | 4.3 | 4.3 | 4.3 | 4.3 | 4.3 | 4.3 | 4.3 | 4.3 | 4.3 |
| Possibility of biaxial stretching | Y | Y | Y | Y | Y | Y | Y | Y | Y | Y |
| Average degree of arrangement of cross section along circumferential direction, Fc1 | 0.58 | 0.46 | 0.43 | 0.57 | 0.50 | 0.34 | 0.43 | 0.36 | 0.30 | 0.51 |
| Average arrangement angle of cross section along circumferential direction Φc1 [°] | 1 | 2 | 2 | 1 | 2 | 5 | 2 | 5 | 7 | 1 |
| Average degree of arrangement of cross section along axial direction, Fc2 | 0.52 | 0.51 | 0.42 | 0.61 | 0.46 | 0.31 | 0.41 | 0.33 | 0.32 | 0.47 |
| Average arrangement angle of cross section along axial direction Φc2 [°] | 1 | 1 | 2 | 1 | 3 | 5 | 1 | 4 | 10 | 1 |
| Surface resistivity Ap [Ω/□] (environment: temperature of 23° C., relative humidity of 50%) | $1.1 \times 10^{10}$ | $7.4 \times 10^{9}$ | $4.6 \times 10^{9}$ | $8.0 \times 10^{9}$ | $5.8 \times 10^{9}$ | $2.6 \times 10^{9}$ | $4.5 \times 10^{9}$ | $8.4 \times 10^{8}$ | $5.2 \times 10^{8}$ | $8.1 \times 10^{9}$ |
| Surface resistivity Bp [Ω/□] (environment: temperature of 30° C., relative humidity of 80%) | $1.0 \times 10^{10}$ | $6.8 \times 10^{9}$ | $4.3 \times 10^{9}$ | $7.4 \times 10^{9}$ | $5.3 \times 10^{9}$ | $2.4 \times 10^{9}$ | $4.2 \times 10^{9}$ | $7.9 \times 10^{8}$ | $5.0 \times 10^{8}$ | $7.6 \times 10^{9}$ |
| Ap/Bp | 1.10 | 1.09 | 1.07 | 1.08 | 1.09 | 1.08 | 1.07 | 1.06 | 1.04 | 1.07 |
| Surface resistivity Aa [Ω/□] (environment: temperature of 23° C., relative humidity of 50%) | $1.0 \times 10^{10}$ | $6.5 \times 10^{9}$ | $4.4 \times 10^{9}$ | $7.6 \times 10^{9}$ | $5.7 \times 10^{9}$ | $2.5 \times 10^{9}$ | $4.3 \times 10^{9}$ | $8.0 \times 10^{8}$ | $5.1 \times 10^{8}$ | $7.7 \times 10^{9}$ |
| Surface resistivity Ba [Ω/□] (environment: temperature of 23° C., relative humidity of 80%) | $9.3 \times 10^{9}$ | $5.9 \times 10^{9}$ | $4.1 \times 10^{9}$ | $7.1 \times 10^{9}$ | $5.2 \times 10^{9}$ | $2.3 \times 10^{9}$ | $4.0 \times 10^{9}$ | $7.6 \times 10^{8}$ | $4.9 \times 10^{8}$ | $7.3 \times 10^{9}$ |
| Aa/Ba | 1.08 | 1.10 | 1.07 | 1.07 | 1.10 | 1.09 | 1.08 | 1.05 | 1.04 | 1.05 |
| DBP oil absorption of carbon black [mL/100 g] | 326 | 311 | 348 | 445 | 460 | 431 | 429 | 473 | 455 | 324 |
| Elastic modulus Ep [MPa] | 1233 | 1258 | 1324 | 1253 | 1277 | 1304 | 1152 | 1184 | 1258 | 1311 |
| Elastic modulus Ea [MPa] | 1285 | 1287 | 1350 | 1269 | 1302 | 1337 | 1132 | 1156 | 1230 | 1335 |
| Shrinkage ratio αp [%] | 5.35 | 5.16 | 5.09 | 5.06 | 4.96 | 4.85 | 5.36 | 5.43 | 5.59 | 3.50 |
| Shrinkage ratio αa [%] | 5.41 | 5.19 | 5.14 | 5.10 | 5.02 | 4.89 | 5.28 | 5.36 | 5.51 | 3.53 |
| Abrasion loss Lt [g] | 0.025 | 0.034 | 0.035 | 0.029 | 0.037 | 0.039 | 0.046 | 0.056 | 0.061 | 0.013 |
| Number of fine line images with toner scattering | 1 | 1 | 0 | 0 | 1 | 0 | 0 | 0 | 0 | 0 |

TABLE 7

| | Example | | | | | | | | |
|---|---|---|---|---|---|---|---|---|---|
| | 11 | 12 | 13 | 14 | 15 | 16 | 17 | 18 | 19 |
| Transverse stretch ratio Lp [times] | 4.0 | 4.0 | 4.0 | 4.0 | 4.0 | 4.0 | 4.0 | 4.0 | 4.0 |
| Longitudinal stretch ratio La [times] | 4.3 | 4.3 | 4.3 | 4.3 | 4.3 | 4.3 | 4.3 | 4.3 | 4.3 |
| Possibility of biaxial stretching | Y | Y | Y | Y | Y | Y | Y | Y | Y |
| Average degree of arrangement of cross section along circumferential direction, Fc1 | 0.35 | 0.57 | 0.40 | 0.42 | 0.37 | 0.35 | 0.49 | 0.51 | 0.42 |
| Average arrangement angle of cross section along circumferential direction Φc1 [°] | 10 | 1 | 7 | 4 | 5 | 3 | 1 | 2 | 3 |
| Average degree of arrangement of cross section along axial direction, Fc2 | 0.39 | 0.59 | 0.39 | 0.44 | 0.38 | 0.33 | 0.52 | 0.46 | 0.40 |

TABLE 7-continued

| | Example | | | | | | | | |
|---|---|---|---|---|---|---|---|---|---|
| | 11 | 12 | 13 | 14 | 15 | 16 | 17 | 18 | 19 |
| Average arrangement angle of cross section along axial direction Φc2 [°] | 8 | 2 | 7 | 3 | 4 | 3 | 1 | 2 | 5 |
| Surface resistivity Ap [Ω/□] (environment: temperature of 23° C., relative humidity of 50%) | $2.3 \times 10^9$ | $6.5 \times 10^9$ | $2.5 \times 10^9$ | $7.1 \times 10^9$ | $2.1 \times 10^9$ | $9.7 \times 10^8$ | $9.7 \times 10^9$ | $6.9 \times 10^9$ | $4.2 \times 10^9$ |
| Surface resistivity Bp [Ω/□] (environment: temperature of 30° C., relative humidity of 80%) | $2.2 \times 10^9$ | $6.2 \times 10^9$ | $2.4 \times 10^9$ | $6.6 \times 10^9$ | $2.0 \times 10^9$ | $9.1 \times 10^8$ | $8.0 \times 10^9$ | $5.8 \times 10^9$ | $3.5 \times 10^9$ |
| Ap/Bp | 1.05 | 1.05 | 1.04 | 1.08 | 1.05 | 1.07 | 1.21 | 1.19 | 1.20 |
| Surface resistivity Aa [Ω/□] (environment: temperature of 23° C., relative humidity of 50%) | $2.2 \times 10^9$ | $6.2 \times 10^9$ | $2.3 \times 10^9$ | $6.7 \times 10^9$ | $2.0 \times 10^9$ | $9.1 \times 10^8$ | $9.5 \times 10^9$ | $6.6 \times 10^9$ | $4.0 \times 10^9$ |
| Surface resistivity Ba [Ω/□] (environment: temperature of 23° C., relative humidity of 80%) | $2.1 \times 10^9$ | $5.8 \times 10^9$ | $2.2 \times 10^9$ | $6.3 \times 10^9$ | $1.9 \times 10^9$ | $8.6 \times 10^8$ | $7.9 \times 10^9$ | $5.5 \times 10^9$ | $3.3 \times 10^9$ |
| Aa/Ba | 1.05 | 1.07 | 1.05 | 1.06 | 1.05 | 1.06 | 1.20 | 1.20 | 1.21 |
| DBP oil absorption of carbon black [mL/100 g] | 452 | 448 | 319 | 337 | 459 | 316 | 324 | 341 | 312 |
| Elastic modulus Ep [MPa] | 1385 | 1260 | 1284 | 1167 | 1128 | 1117 | 1247 | 1263 | 1325 |
| Elastic modulus Ea [MPa] | 1391 | 1285 | 1306 | 1141 | 1109 | 1102 | 1256 | 1273 | 1348 |
| Shrinkage ratio αp [%] | 3.34 | 4.39 | 4.25 | 4.22 | 4.18 | 4.12 | 5.21 | 5.12 | 5.03 |
| Shrinkage ratio αa [%] | 3.38 | 4.41 | 4.29 | 4.15 | 4.11 | 4.09 | 5.27 | 5.06 | 5.10 |
| Abrasion loss Lt [g] | 0.036 | 0.031 | 0.041 | 0.046 | 0.059 | 0.062 | 0.025 | 0.033 | 0.037 |
| Number of fine line images with toner scattering | 0 | 0 | 0 | 1 | 0 | 0 | 2 | 2 | 2 |

TABLE 8

| | Comparative Example | | | | | | | | | |
|---|---|---|---|---|---|---|---|---|---|---|
| | 1 | 2 | 3 | 4 | 5 | 6 | 7 | 8 | 9 | 10 |
| Transverse stretch ratio Lp [times] | — | — | — | — | 4.0 | 4.0 | 4.0 | — | — | — |
| Longitudinal stretch ratio La [times] | — | — | — | — | 4.3 | 4.3 | 4.3 | — | — | — |
| Possibility of biaxial stretching | N | N | N | N | Y | Y | Y | — | — | — |
| Average degree of arrangement of cross section along circumferential direction, Fc1 | — | — | — | — | 0.41 | 0.02 | — | 0.02 | 0.03 | 0.02 |
| Average arrangement angle of cross section along circumferential direction Φc1 [°] | — | — | — | — | 4 | *1 | — | *1 | *1 | *1 |
| Average degree of arrangement of cross section along axial direction, Fc2 | — | — | — | — | 0.43 | 0.03 | — | 0.02 | 0.02 | 0.01 |
| Average arrangement angle of cross section along axial direction Φc2 [°] | — | — | — | — | 3 | *2 | — | *2 | *2 | *2 |
| Surface resistivity Ap [Ω/□] (temperature of 23° C., 50% RH) | — | — | — | — | $7.3 \times 10^{10}$ | $9.3 \times 10^{10}$ | $2.9 \times 10^9$ | $6.2 \times 10^{13}$ | $2.4 \times 10^{13}$ | $3.8 \times 10^{13}$ |
| Surface resistivity Bp [Ω/□] (temperature of 30° C., 80% RH) | — | — | — | — | $6.8 \times 10^9$ | $7.9 \times 10^9$ | $5.6 \times 10^8$ | $5.8 \times 10^{13}$ | $3.5 \times 10^{13}$ | $2.2 \times 10^{13}$ |
| Ap/Bp | — | — | — | — | 10.74 | 11.77 | 5.18 | 1.07 | 0.69 | 1.73 |
| Surface resistivity Aa [Ω/□] (temperature of 23° C., 50% RH) | — | — | — | — | $6.4 \times 10^{10}$ | $8.9 \times 10^{10}$ | $2.8 \times 10^9$ | $5.9 \times 10^{13}$ | $2.6 \times 10^{13}$ | $3.9 \times 10^{13}$ |
| Surface resistivity Ba [Ω/□] (temperature of 30° C., 80% RH) | — | — | — | — | $5.9 \times 10^9$ | $7.3 \times 10^9$ | $5.5 \times 10^8$ | $5.6 \times 10^{13}$ | $3.6 \times 10^{13}$ | $2.2 \times 10^{13}$ |
| Aa/Ba | — | — | — | — | 10.85 | 12.19 | 5.09 | 1.05 | 0.72 | 1.77 |
| DBP oil absorption of carbon black [mL/100 g] | 322 | 319 | 345 | 340 | 142 | 154 | — | 342 | 436 | 391 |
| Elastic modulus Ep [MPa] | — | — | — | — | 1078 | 1065 | 1110 | 824 | 796 | 524 |
| Elastic modulus Ea [MPa] | — | — | — | — | 1049 | 1041 | 1102 | 795 | 767 | 487 |
| Shrinkage ratio αp [%] | — | — | — | — | 5.08 | 4.65 | 5.32 | 0.85 | 0.65 | 0.42 |
| Shrinkage ratio αa [%] | — | — | — | — | 5.21 | 4.89 | 5.43 | 1.02 | 0.73 | 0.39 |
| Abrasion loss Lt [g] | — | — | — | — | 0.175 | 0.266 | 0.016 | 0.184 | 0.225 | 0.426 |

TABLE 8-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| Number of fine line images with toner scattering | — | — | — | — | 21 | 22 | 16 | — | — | 1 |

In Table 8, *1 and *2 indicate that the average degree of arrangements Fc1 and Fc2 were so small that the average arrangement angle could not be calculated. In Comparative Examples 1 or 2, the amorphous polyester was not contained. In other words, it is considered that when the preform was heated during the primary blow, spherocrystallization with carbon black as a crystalline nucleus was promoted, and the preform became so hard that the preform could not be stretch-blown.

In Comparative Examples 3 or 4, no crystalline polyester was contained. In other words, it is considered that when the preform was biaxially stretched, the strength was not increased due to oriented crystallization, and the preform was broken from a locally thinned portion.

The abrasion resistance of the inner circumferential surface of the electrophotographic belt according to Comparative Example 5 was inferior to the abrasion resistance of the electrophotographic belts according to Examples. The reason is that in the electrophotographic belt, the carbon black was unevenly distributed in the phase containing the polyether ester amide. The polyether ester amide had low affinity with the crystalline polyester. Therefore, it is considered that an interface between the phase containing the polyether ester amide and the phase containing the crystalline polyester is peeled off during the abrasion resistance test.

The abrasion resistance of the inner circumferential surface of the electrophotographic belt according to Comparative Example 6 was also inferior to the abrasion resistance of the electrophotographic belts according to Examples. The reason is that in the electrophotographic belt, the carbon black was relatively uniformly dispersed in both the phase containing the polyether ester amide and the phase containing the crystalline polyester in the base layer. Therefore, it is considered that the carbon black was exposed on the inner circumferential surface with the abrasion of the inner circumferential surface of the electrophotographic belt, and the carbon black fell off from the inner circumferential surface. As a result, it is considered that when the roughening of the inner circumferential surface progresses and abrasion is accelerated, the abrasion resistance is relatively lowered.

In Comparative Examples 7 to 10, since the cylindrical film was produced by extrusion molding, the elastic modulus was small, and the arrangement of the carbon black was hardly confirmed. Since the arrangement of the carbon black was weak, an electro-conductive path was not successfully formed, resulting in a high surface resistivity value. The transfer bias was not sufficiently applied, and therefore the scattering image of toner could not be evaluated. The results also showed a heavy abrasion loss.

The present disclosure encompasses the following configurations.

[Configuration 1]

An electrophotographic belt having a cylindrical film as a base layer, the cylindrical film comprising a crystalline polyester, an amorphous polyester and carbon black, a content of the carbon black in the cylindrical film being 2.0% by mass or more; and Fc1 being 0.30 or more, and Φc1 being −10° to +10°, where Fc1 denotes an average degree of arrangement of the carbon black in the circumferential direction observed in a cross section in a direction along a circumferential direction of the cylindrical film, and Φc1 denotes an average arrangement angle of the carbon black in the circumferential direction observed in a cross section in a direction along a circumferential direction of the cylindrical film.

[Configuration 2]

The electrophotographic belt according to configuration 1, in which the cylindrical film has a first phase containing the amorphous polyester and the carbon black and a second phase containing the crystalline polyester.

[Configuration 3]

The electrophotographic belt according to configuration 1 or 2, in which the Fc1 is 0.30 or more and 0.99 or less.

[Configuration 4]

The electrophotographic belt according to any of configurations 1 to 3, wherein Fc2 is 0.30 or more, and Φc2 is −10° to +10°, where Fc2 denotes an average degree of arrangement of the carbon black in the axial direction observed in a cross section in a direction along an axial direction of the cylindrical film, and Φc2 denotes an average arrangement angle of the carbon black in the axial direction observed in a cross section in a direction along an axial direction of the cylindrical film.

[Configuration 5]

The electrophotographic belt according to configuration 4, wherein the Fc2 is 0.30 or more and 0.99 or less.

[Configuration 6]

The electrophotographic belt according to any of configurations 1 to 5, wherein the cylindrical film is a biaxially stretched cylindrical film.

[Configuration 7]

The electrophotographic belt according to any of configurations 1 to 6, wherein Ap is $1\times10^3$ Ω/square or more and $1\times10^{13}$ Ω/square or less, where Ap denotes a surface resistivity in a circumferential direction measured on an inner circumferential surface of the cylindrical film in an environment of a temperature of 23° C. and a relative humidity of 50%.

[Configuration 8]

The electrophotographic belt according to configuration 7, wherein (Ap/Bp) is 3.00 or less, where Bp denotes a surface resistivity in a circumferential direction measured on an inner circumferential surface of the cylindrical film which has been left to stand for 24 hours under an environment of a temperature of 30° C. and a relative humidity of 80%.

[Configuration 9]

The electrophotographic belt according to any of configurations 1 to 8, wherein Aa is $1\times10^3$ Ω/square or more and $1\times10^{13}$ Ω/square or less where Aa is a surface resistivity in an axial direction measured on an inner circumferential surface of the cylindrical film in an environment of a temperature of 23° C. and a relative humidity of 50%.

[Configuration 10]

The electrophotographic belt according to configuration 9, wherein (Aa/Ba) is 3.00 or less where Ba denotes a surface resistivity in an axial direction measured on an inner circumferential surface of the cylindrical film which has been left to stand for 24 hours under an environment of a temperature of 30° C. and a relative humidity of 80%.

[Configuration 11]

The electrophotographic belt according to any of configurations 1 to 10, wherein in which a content of an ionic electro-conductive agent in the cylindrical film is 0.0% by mass or more and 2.0% by mass or less.

[Configuration 12]

The electrophotographic belt according to any of configurations 1 to 11, in which the crystalline polyester includes at least one selected from the group consisting of polyalkylene terephthalate, and polyalkylene naphthalate, polyalkylene isophthalate, and a copolymer containing at least two of those.

[Configuration 13]

The electrophotographic belt according to any of configurations 1 to 12, in which the amorphous polyester has a monomer unit derived from at least one phthalic acid selected from the group consisting of terephthalic acid, orthophthalic acid and isophthalic acid, and a monomer unit derived from at least two diols selected from the group consisting of ethylene glycol, diethylene glycol, propylene glycol, neopentyl glycol and cyclohexanedimethanol.

[Configuration 14]

The electrophotographic belt according to any of configurations 1 to 13, in which a content of the amorphous polyester is 100.0% by mass or less relative to a content of the crystalline polyester.

[Configuration 15]

The electrophotographic belt according to any of configurations 1 to 14, in which the carbon black has a DBP absorption of 300 mL/100 g or more.

[Configuration 16]

The electrophotographic belt according to any of configurations 1 to 15, wherein Ep is 1000 MPa or more and Ea is 1000 MPa or more, where Ep denotes a tensile elastic modulus in the circumferential direction, and Ea denotes a tensile elastic modulus in a direction perpendicular to the circumferential direction.

[Configuration 17]

The electrophotographic belt according to any of configurations 1 to 16, wherein αp is 2.0% or more and αa is 2.0% or more, where αp denotes a shrinkage ratio in a circumferential direction, αa denotes a shrinkage ratio in a direction perpendicular to the circumferential direction.

[Configuration 18]

The electrophotographic belt according to any of configurations 1 to 17, being an intermediate transfer belt.

[Configuration 19]

An electrophotographic image forming apparatus comprising the electrophotographic belt according to any of configurations 1 to 18 as an intermediate transfer belt.

[Configuration 20]

The electrophotographic image forming apparatus according to configuration 19, further comprising a plurality of rollers for stretching and rotating the electrophotographic belt, the rollers being disposed in contact with an inner circumference surface of the electrophotographic belt.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-181535, filed Nov. 5, 2021, and Japanese Patent Application No. 2022-134699, filed Aug. 26, 2022, which are hereby incorporated by reference herein in their entirety.

What is claimed is:

1. An electrophotographic belt comprising a cylindrical film as a base layer,
the cylindrical film comprising a crystalline polyester, an amorphous polyester and carbon black,
a content of the carbon black in the cylindrical film being 2.0% by mass or more; and
Fc1 being 0.30 or more, and Φc1 being −10° to +10°,
where Fc1 denotes an average degree of arrangement of the carbon black in a circumferential direction observed in a cross section in a direction along the circumferential direction of the cylindrical film, and Φc1 denotes an average arrangement angle of the carbon black in the circumferential direction observed in the cross section in the direction along the circumferential direction of the cylindrical film.

2. The electrophotographic belt according to claim 1,
wherein the cylindrical film comprises a first phase comprising the amorphous polyester and the carbon black and a second phase comprising the crystalline polyester.

3. The electrophotographic belt according to claim 1, wherein the Fc1 is 0.30 to 0.99.

4. The electrophotographic belt according to claim 1, wherein Fc2 is 0.30 or more, and Φc2 is −10° to +10°, where Fc2 denotes an average degree of arrangement of the carbon black in an axial direction observed in a cross section in a direction along the axial direction of the cylindrical film, and Φc2 denotes an average arrangement angle of the carbon black in the axial direction observed in the cross section in the direction along the axial direction of the cylindrical film.

5. The electrophotographic belt according to claim 4, wherein the Fc2 is 0.30 to 0.99.

6. The electrophotographic belt according to claim 1, wherein the cylindrical film is a biaxially stretched cylindrical film.

7. The electrophotographic belt according to claim 1, wherein Ap is $1\times10^3$ Ω/square to $1\times10^{13}$ Ω/square, where Ap denotes a surface resistivity in the circumferential direction measured on an inner circumferential surface of the cylindrical film in an environment of a temperature of 23° C. and a relative humidity of 50%.

8. The electrophotographic belt according to claim 7, wherein (Ap/Bp) is 3.00 or less, where Bp denotes a surface resistivity in the circumferential direction measured on the inner circumferential surface of the cylindrical film which has been left to stand for 24 hours under an environment of a temperature of 30° C. and a relative humidity of 80%.

9. The electrophotographic belt according to claim 1, wherein Aa is $1\times10^3$ Ω/square to $1\times10^{13}$ Ω/square where Aa is a surface resistivity in an axial direction measured on an inner circumferential surface of the cylindrical film in an environment of a temperature of 23° C. and a relative humidity of 50%.

10. The electrophotographic belt according to claim 9, wherein (Aa/Ba) is 3.00 or less where Ba denotes a surface resistivity in the axial direction measured on the inner circumferential surface of the cylindrical film which has been left to stand for 24 hours under an environment of a temperature of 30° C. and a relative humidity of 80%.

11. The electrophotographic belt according to claim 1, wherein a content of an ionic electro-conductive agent in the cylindrical film is 0.0% by mass to 2.0% by mass.

12. The electrophotographic belt according to claim 1, wherein the crystalline polyester comprises at least one selected from the group consisting of polyalkylene terephthalate, and polyalkylene naphthalate, polyalkylene isophthalate, and a copolymer containing at least two of those.

13. The electrophotographic belt according to claim 1, wherein the amorphous polyester comprises a monomer unit derived from at least one phthalic acid selected from the group consisting of terephthalic acid, orthophthalic acid and isophthalic acid, and a monomer unit derived from at least two diols selected from the group consisting of ethylene glycol, diethylene glycol, propylene glycol, neopentyl glycol and cyclohexanedimethanol.

14. The electrophotographic belt according to claim 1, wherein a content of the amorphous polyester is 100.0% by mass or less relative to a content of the crystalline polyester.

15. The electrophotographic belt according to claim 1, wherein the carbon black has a DBP absorption of 300 mL/100 g or more.

16. The electrophotographic belt according to claim 1, wherein Ep is 1000 MPa or more and Ea is 1000 MPa or more, where Ep denotes a tensile elastic modulus in the circumferential direction, and Ea denotes a tensile elastic modulus in a direction perpendicular to the circumferential direction.

17. The electrophotographic belt according to claim 1, wherein αp is 2.0% or more and αa is 2.0% or more, where ap denotes a shrinkage ratio in the circumferential direction, αa denotes a shrinkage ratio in a direction perpendicular to the circumferential direction.

18. The electrophotographic belt according to claim 1, which is an intermediate transfer belt.

19. An electrophotographic image forming apparatus comprising an electrophotographic belt as an intermediate transfer belt, the electrophotographic belt comprising a cylindrical film as a base layer, wherein:

the cylindrical film comprises a crystalline polyester, an amorphous polyester and carbon black;

a content of the carbon black in the cylindrical film is 2.0% by mass or more; and Fc1 is 0.30 or more, and Φc1 is −10° to +10°, where Fc1 denotes an average degree of arrangement of the carbon black in a circumferential direction observed in a cross section in a direction along the circumferential direction of the cylindrical film, and Φc1 denotes an average arrangement angle of the carbon black in the circumferential direction observed in the cross section in the direction along the circumferential direction of the cylindrical film.

20. The electrophotographic image forming apparatus according to claim 19, further comprising a plurality of rollers for stretching and rotating the electrophotographic belt, the rollers being disposed in contact with an inner circumference surface of the electrophotographic belt.

* * * * *